(12) United States Patent
Karafin et al.

(10) Patent No.: US 12,061,356 B2
(45) Date of Patent: Aug. 13, 2024

(54) HIGH DENSITY ENERGY DIRECTING DEVICE

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 18/199,483

(22) Filed: May 19, 2023

(65) Prior Publication Data

US 2024/0061166 A1 Feb. 22, 2024

Related U.S. Application Data

(63) Continuation of application No. 17/246,485, filed on Apr. 30, 2021, now Pat. No. 11,681,091, which is a
(Continued)

(30) Foreign Application Priority Data

Jul. 14, 2017 (WO) ................ PCT/US2017/042275
Jul. 14, 2017 (WO) ................ PCT/US2017/042276

(51) Int. Cl.
*F21V 8/00* (2006.01)
*G02B 3/00* (2006.01)
(Continued)

(52) U.S. Cl.
CPC ....... *G02B 6/0096* (2013.01); *G02B 6/02042* (2013.01); *G02B 6/023* (2013.01);
(Continued)

(58) Field of Classification Search
CPC ...... G02B 6/0096; G02B 30/33; G02B 30/00; G02B 6/02042; G02B 6/023; G02B 6/04;
(Continued)

(56) References Cited

U.S. PATENT DOCUMENTS 3,505,046 A 4/1970 Phaneuf
3,567,549 A 3/1971 Hoffmeister et al.
(Continued)

FOREIGN PATENT DOCUMENTS

CA 979696 A 12/1975
CN 1046998 A 11/1990
(Continued)

OTHER PUBLICATIONS

CN201980018334.2 Second Office Action of the Chinese Patent Office mailed May 10, 2023.
(Continued)

*Primary Examiner* — Nicole M Ippolito
*Assistant Examiner* — Hanway Chang

(57) ABSTRACT

Disclosed embodiments include an energy directing device having one or more energy relay elements configured to direct energy from one or more energy locations through the device. In an embodiment, surfaces of the one or more energy relay elements may form a singular seamless energy surface where a separation between adjacent energy relay element surfaces is less than a minimum perceptible contour. In disclosed embodiments, energy is produced at energy locations having an active energy surface and a mechanical envelope. In an embodiment, the energy directing device is configured to relay energy from the energy locations through the singular seamless energy surface while minimizing separation between energy locations due to their mechanical
(Continued)

envelope. In embodiments, the energy relay elements may comprise energy relays utilizing transverse Anderson localization phenomena.

19 Claims, 16 Drawing Sheets

Related U.S. Application Data continuation of application No. 16/694,772, filed on Nov. 25, 2019, now Pat. No. 10,996,393, which is a continuation of application No. 16/064,204, filed as application No. PCT/US2017/042452 on Jul. 17, 2017, now Pat. No. 10,488,584.

(60) Provisional application No. 62/507,500, filed on May 17, 2017, provisional application No. 62/366,076, filed on Jul. 24, 2016, provisional application No. 62/362,602, filed on Jul. 15, 2016.

(51) Int. Cl.
| | |
|---|---|
| *G02B 6/02* | (2006.01) |
| *G02B 6/04* | (2006.01) |
| *G02B 6/08* | (2006.01) |
| *G02B 6/293* | (2006.01) |
| *G02B 25/00* | (2006.01) |
| *G02B 27/00* | (2006.01) |
| *G02B 27/01* | (2006.01) |
| *G02B 27/09* | (2006.01) |
| *G02B 27/10* | (2006.01) |
| *G02B 30/00* | (2020.01) |
| *G02B 30/33* | (2020.01) |
| *G02B 30/56* | (2020.01) |
| *G03H 1/22* | (2006.01) |
| *G10K 11/26* | (2006.01) |
| *G21K 1/00* | (2006.01) |
| *H04N 5/89* | (2006.01) |
| *H04N 13/388* | (2018.01) |
| *H04N 23/957* | (2023.01) |
| *G02B 3/08* | (2006.01) |
| *G02B 5/32* | (2006.01) |
| *G03H 1/00* | (2006.01) |
| *G03H 1/02* | (2006.01) |
| *G06F 3/01* | (2006.01) |
| *H04N 13/344* | (2018.01) |

(52) U.S. Cl.
CPC ............. *G02B 6/04* (2013.01); *G02B 6/08* (2013.01); *G02B 6/29325* (2013.01); *G02B 27/0172* (2013.01); *G02B 27/0955* (2013.01); *G02B 27/0994* (2013.01); *G02B 27/1066* (2013.01); *G02B 30/00* (2020.01); *G02B 30/33* (2020.01); *H04N 13/388* (2018.05); *G02B 3/0056* (2013.01); *G02B 3/08* (2013.01); *G02B 5/32* (2013.01); *G02B 6/0229* (2013.01); *G02B 6/02295* (2013.01); *G02B 25/00* (2013.01); *G02B 25/002* (2013.01); *G02B 27/0093* (2013.01); *G02B 27/0103* (2013.01); *G02B 2027/0105* (2013.01); *G02B 2027/0134* (2013.01); *G02B 2027/0174* (2013.01); *G02B 27/1073* (2013.01); *G02B 30/56* (2020.01); *G03H 1/0005* (2013.01); *G03H 2001/0088* (2013.01); *G03H 1/0248* (2013.01); *G03H 1/2202* (2013.01); *G03H 1/2294* (2013.01); *G03H 2223/19* (2013.01); *G06F 3/01* (2013.01); *G06F 3/013* (2013.01); *G10K 11/26* (2013.01); *G21K 1/00* (2013.01); *H04N 5/89* (2013.01); *H04N 13/344* (2018.05); *H04N 23/957* (2023.01); *Y02E 10/52* (2013.01)

(58) Field of Classification Search
CPC .. G02B 6/08; G02B 6/29325; G02B 27/0172; G02B 27/0955; G02B 27/0994; G02B 27/1066; G02B 30/56; G02B 3/0056; G02B 3/08; G02B 5/32; G02B 6/0229; G02B 6/02295; G02B 25/00; G02B 25/002; G02B 27/0093; G02B 27/0103; G02B 27/1073; G02B 2027/0105; G02B 2027/0134; G02B 2027/0174; G03H 1/0005; G03H 1/0248; G03H 1/2202; G03H 1/2294; G03H 2001/0088; G03H 2223/19; G06F 3/01; G06F 3/013; G10K 11/26; G21K 1/00; H04N 13/388; H04N 13/344; H04N 23/957; H04N 5/89; Y02E 10/52

See application file for complete search history.

(56) References Cited

U.S. PATENT DOCUMENTS

| | | |
|---|---|---|
| 3,626,040 A | 12/1971 | Nagao et al. |
| 3,859,071 A | 1/1975 | Beasley et al. |
| 3,870,399 A | 3/1975 | Randall et al. |
| 3,961,931 A | 6/1976 | Nakagawa et al. |
| 4,087,159 A | 5/1978 | Ulrich |
| 4,099,833 A | 7/1978 | Tosswill |
| 4,134,642 A | 1/1979 | Kapron et al. |
| 4,143,234 A | 3/1979 | Johnson et al. |
| 4,149,772 A | 4/1979 | Iyengar et al. |
| 4,265,515 A | 5/1981 | Kao |
| 4,372,769 A | 2/1983 | Hicks, Jr. |
| 5,371,826 A | 12/1994 | Friedman |
| 5,374,976 A | 12/1994 | Spannenburg |
| 5,465,308 A | 11/1995 | Hutcheson et al. |
| 5,479,550 A | 12/1995 | Nishioka et al. |
| 5,481,385 A | 1/1996 | Zimmerman et al. |
| 5,519,801 A | 5/1996 | Noane et al. |
| 5,553,184 A | 9/1996 | Eikelmann et al. |
| 5,822,125 A | 10/1998 | Meyers |
| 5,949,581 A | 9/1999 | Kurtenbach et al. |
| 5,974,215 A | 10/1999 | Bilbro et al. |
| 6,013,072 A | 1/2000 | Winston et al. |
| 6,041,154 A | 3/2000 | Ono et al. |
| 6,384,400 B1 | 5/2002 | Albagli et al. |
| 6,487,351 B1 | 11/2002 | Cryan et al. |
| 6,611,648 B2 | 8/2003 | Kumar et al. |
| 6,614,972 B1 | 9/2003 | Lundin |
| 6,680,761 B1 | 1/2004 | Greene et al. |
| 7,016,516 B2 | 3/2006 | Rhoads |
| 7,054,850 B2 | 5/2006 | Matsugu |
| 7,235,047 B2 | 6/2007 | MacAulay et al. |
| RE39,864 E | 10/2007 | Athale et al. |
| 7,329,982 B2 | 2/2008 | Conner et al. |
| 7,773,849 B2 | 8/2010 | Shani |
| 8,149,265 B2 | 4/2012 | Smalley et al. |
| 8,369,546 B2 | 2/2013 | Pompei |
| 8,406,595 B2 | 3/2013 | Hayashi |
| 8,477,906 B2 | 7/2013 | Morse et al. |
| 8,619,177 B2 | 12/2013 | Perwass et al. |
| 8,736,675 B1 | 5/2014 | Holzbach et al. |
| 8,743,466 B2 | 6/2014 | Yamamoto |
| 9,063,289 B1 | 6/2015 | Farmer et al. |
| 9,158,080 B2 | 10/2015 | Logunov et al. |
| 9,411,511 B1 | 8/2016 | Sivertsen |
| 9,494,738 B1 | 11/2016 | Farmer et al. |
| 9,612,395 B2 | 4/2017 | Karbasivalashani et al. |
| 9,835,812 B2 | 12/2017 | Yadlowsky |
| 9,945,985 B2 | 4/2018 | Morasse |
| 10,009,597 B2 | 6/2018 | Karafin et al. |
| 10,052,831 B2 | 8/2018 | Welker et al. |
| 10,094,974 B2 | 10/2018 | Chen et al. |

(56) References Cited

U.S. PATENT DOCUMENTS

| | | |
|---|---|---|
| 10,132,993 B2 | 11/2018 | Buczynski et al. |
| 10,432,919 B2 | 10/2019 | Lapstun |
| 10,488,584 B2 | 11/2019 | Karafin et al. |
| 10,551,628 B2 | 2/2020 | Karafin et al. |
| 10,560,689 B2 | 2/2020 | Lapstun |
| 10,860,142 B1 | 12/2020 | Northcott et al. |
| 10,877,210 B2 | 12/2020 | Karafin et al. |
| 10,884,142 B2 | 1/2021 | Welker |
| 10,884,251 B2 | 1/2021 | Karafin et al. |
| 10,989,869 B2 | 4/2021 | Karafin et al. |
| 10,996,393 B2 | 5/2021 | Karafin et al. |
| 11,221,670 B2 | 1/2022 | Karafin et al. |
| 11,556,015 B2 | 1/2023 | Karafin et al. |
| 2001/0002865 A1 | 6/2001 | Lipponen et al. |
| 2001/0028356 A1 | 10/2001 | Balogh |
| 2002/0009261 A1 | 1/2002 | Bhagavatula et al. |
| 2002/0021501 A1 | 2/2002 | Kawashima et al. |
| 2002/0048427 A1 | 4/2002 | Chiarulli et al. |
| 2002/0172478 A1 | 11/2002 | Sahlin |
| 2003/0026567 A1 | 2/2003 | Cryan et al. |
| 2003/0030912 A1 | 2/2003 | Gleckman et al. |
| 2003/0137730 A1 | 7/2003 | Fridman et al. |
| 2004/0001679 A1 | 1/2004 | Sisodia et al. |
| 2004/0108806 A1 | 6/2004 | Cok et al. |
| 2005/0041944 A1 | 2/2005 | Cryan et al. |
| 2006/0028400 A1 | 2/2006 | Lapstun et al. |
| 2006/0102604 A1 | 5/2006 | Dane et al. |
| 2006/0146428 A1 | 7/2006 | Lim et al. |
| 2006/0165358 A1 | 7/2006 | Trebst et al. |
| 2006/0191566 A1 | 8/2006 | Schaafsma |
| 2006/0241572 A1 | 10/2006 | Zhou |
| 2006/0256415 A1 | 11/2006 | Holmes et al. |
| 2007/0097108 A1 | 5/2007 | Brewer |
| 2007/0238296 A1 | 10/2007 | Shimizu |
| 2007/0291504 A1 | 12/2007 | Lu |
| 2008/0023137 A1 | 1/2008 | Jiang et al. |
| 2008/0087047 A1 | 4/2008 | Bayindir et al. |
| 2008/0144174 A1 | 6/2008 | Lucente et al. |
| 2008/0170293 A1 | 7/2008 | Lucente et al. |
| 2008/0285125 A1 | 11/2008 | Lee et al. |
| 2009/0040294 A1 | 2/2009 | Smalley et al. |
| 2009/0085831 A1 | 4/2009 | Odoi et al. |
| 2009/0148098 A1 | 6/2009 | Lewis et al. |
| 2009/0164397 A1 | 6/2009 | Kwok |
| 2009/0220201 A1 | 9/2009 | Reichel et al. |
| 2009/0266992 A1 | 10/2009 | Beekman |
| 2009/0273538 A1 | 11/2009 | Smith et al. |
| 2009/0314929 A1 | 12/2009 | Lee et al. |
| 2010/0119200 A1 | 5/2010 | Tabor |
| 2010/0265457 A1 | 10/2010 | Chomyn et al. |
| 2010/0272234 A1 | 10/2010 | Morse et al. |
| 2010/0278480 A1 | 11/2010 | Vasylyev |
| 2011/0012895 A1 | 1/2011 | Lucente et al. |
| 2011/0094269 A1 | 4/2011 | Mukasa |
| 2011/0114831 A1 | 5/2011 | Grier |
| 2011/0169832 A1 | 7/2011 | Brown et al. |
| 2012/0050562 A1 | 3/2012 | Perwass et al. |
| 2012/0268950 A1 | 10/2012 | Parkyn et al. |
| 2012/0313839 A1 | 12/2012 | Smithwick et al. |
| 2013/0069933 A1 | 3/2013 | Smithwick et al. |
| 2013/0076930 A1 | 3/2013 | Border et al. |
| 2013/0082905 A1 | 4/2013 | Ranieri et al. |
| 2013/0088785 A1 | 4/2013 | Yamamoto |
| 2013/0140916 A1 | 6/2013 | Dunlap et al. |
| 2013/0163089 A1 | 6/2013 | Bohn |
| 2013/0195410 A1 | 8/2013 | Karbasivalashani et al. |
| 2013/0208082 A1 | 8/2013 | Williams et al. |
| 2013/0265485 A1 | 10/2013 | Kang |
| 2014/0035959 A1 | 2/2014 | Lapstun |
| 2014/0126322 A1 | 5/2014 | Cipolla et al. |
| 2014/0132694 A1 | 5/2014 | Shacham et al. |
| 2014/0184496 A1 | 7/2014 | Gribetz et al. |
| 2014/0192087 A1 | 7/2014 | Frost |
| 2014/0293385 A1 | 10/2014 | Smithwick |
| 2014/0300694 A1 | 10/2014 | Smalley et al. |
| 2014/0300695 A1 | 10/2014 | Smalley et al. |
| 2014/0300709 A1 | 10/2014 | Futterer et al. |
| 2014/0307179 A1 | 10/2014 | Zhao et al. |
| 2014/0371353 A1 | 12/2014 | Mitchell et al. |
| 2015/0085464 A1 | 3/2015 | Suzuki |
| 2015/0146132 A1 | 5/2015 | Katsuta et al. |
| 2015/0201186 A1 | 7/2015 | Smithwick |
| 2015/0212274 A1 | 7/2015 | Kopp et al. |
| 2015/0219940 A1 | 8/2015 | Kim et al. |
| 2015/0241608 A1 | 8/2015 | Shian et al. |
| 2015/0247976 A1 | 9/2015 | Abovitz et al. |
| 2015/0277378 A1 | 10/2015 | Smithwick et al. |
| 2016/0004055 A1 | 1/2016 | Delsaut et al. |
| 2016/0070059 A1 | 3/2016 | Chen et al. |
| 2016/0139402 A1 | 5/2016 | Lapstun |
| 2016/0170372 A1 | 6/2016 | Smithwick |
| 2016/0175701 A1 | 6/2016 | Froy et al. |
| 2016/0209657 A1 | 7/2016 | Popovich et al. |
| 2016/0274539 A1 | 9/2016 | Smithwick |
| 2016/0282614 A1 | 9/2016 | Zagolla et al. |
| 2016/0282808 A1 | 9/2016 | Smalley |
| 2017/0016996 A1 | 1/2017 | Welker et al. |
| 2017/0209121 A1 | 7/2017 | Davis et al. |
| 2017/0214907 A1 | 7/2017 | Lapstun |
| 2017/0289530 A1 | 10/2017 | Smithwick et al. |
| 2017/0363805 A1 | 12/2017 | Iwakawa |
| 2018/0063519 A1 | 3/2018 | Smithwick et al. |
| 2018/0084245 A1 | 3/2018 | Lapstun |
| 2018/0128973 A1 | 5/2018 | Powell et al. |
| 2018/0356591 A1 | 12/2018 | Karafin et al. |
| 2018/0372926 A1 | 12/2018 | Karafin et al. |
| 2018/0372958 A1 | 12/2018 | Karafin et al. |
| 2019/0004228 A1 | 1/2019 | Bevensee et al. |
| 2019/0004319 A1 | 1/2019 | Karafin et al. |
| 2019/0004326 A1 | 1/2019 | Karafin et al. |
| 2019/0011621 A1 | 1/2019 | Karafin et al. |
| 2019/0227226 A1 | 7/2019 | Abaie et al. |
| 2019/0259320 A1 | 8/2019 | Lapstun |
| 2020/0124746 A1 | 4/2020 | Welker |
| 2020/0394791 A1 | 12/2020 | Pang et al. |
| 2021/0063766 A1 | 3/2021 | Karafin et al. |
| 2021/0253468 A1 | 8/2021 | Wood et al. |

FOREIGN PATENT DOCUMENTS

| | | |
|---|---|---|
| CN | 1973226 A | 5/2007 |
| CN | 101052910 A | 10/2007 |
| CN | 101095244 A | 12/2007 |
| CN | 102231044 A | 11/2011 |
| CN | 102591124 A | 7/2012 |
| CN | 103616770 A | 3/2014 |
| CN | 103777455 A | 5/2014 |
| CN | 105334690 A | 2/2016 |
| CN | 105378377 A | 3/2016 |
| CN | 106233227 A | 12/2016 |
| EP | 1076246 A1 | 2/2001 |
| GB | 474564 A | 11/1937 |
| GB | 1399597 A | 7/1975 |
| GB | 2253070 A | 8/1992 |
| JP | S59105800 A | 6/1984 |
| JP | S60030407 U | 3/1985 |
| JP | H0561417 A | 3/1993 |
| JP | H06258532 A | 9/1994 |
| JP | H08179131 A | 7/1996 |
| JP | H10191496 A | 7/1998 |
| JP | 2000009947 A | 1/2000 |
| JP | 2000347046 A | 12/2000 |
| JP | 2001313959 A | 11/2001 |
| JP | 2003330109 A | 11/2003 |
| JP | 2004078123 A | 3/2004 |
| JP | 2005181460 A | 7/2005 |
| JP | 2005222087 A | 8/2005 |
| JP | 2007098930 A | 4/2007 |
| JP | 2007512954 A | 5/2007 |
| JP | 2008052010 A | 3/2008 |
| JP | 2008058583 A | 3/2008 |
| JP | 2008518473 A | 5/2008 |
| JP | 2009169142 A | 7/2009 |
| JP | 2009169143 A | 7/2009 |

(56) References Cited

FOREIGN PATENT DOCUMENTS

| | | | |
|---|---|---|---|
| JP | 2009530661 | A | 8/2009 |
| JP | 2011090272 | A | 5/2011 |
| JP | 2014142368 | A | 8/2014 |
| JP | 2015143858 | A | 8/2015 |
| JP | 2016518629 | A | 6/2016 |
| JP | 7063520 | B2 | 5/2022 |
| KR | 101298848 | B1 | 8/2013 |
| TW | 200402012 | A | 2/2004 |
| TW | 200633258 | A | 9/2006 |
| WO | 0106287 | A1 | 1/2001 |
| WO | 0154106 | A2 | 7/2001 |
| WO | 2005057670 | A2 | 6/2005 |
| WO | 2008048360 | A2 | 4/2008 |
| WO | 2008093721 | A1 | 8/2008 |
| WO | 2011158752 | A1 | 12/2011 |
| WO | 2012029081 | A1 | 3/2012 |
| WO | 2016046088 | A1 | 3/2016 |
| WO | 2017007526 | A2 | 1/2017 |
| WO | 2017127897 | A1 | 8/2017 |
| WO | 2019140348 | A2 | 7/2019 |

OTHER PUBLICATIONS

Fifty years of Anderson localization, Ad Lagendijk, Bart van Tiggelen, and Diederik S. Wiersma, Phsyics Today 62(8), 24 (2009). (Year: 2009).
EP-19738344.1 European Exam Report of European Patent Office dated Aug. 9, 2023.
"Plastics-Vocabulary", International Organization for Standardization, Switzerland 1999, ISO 472 2013.
AU-2017296073 Examination Report No. 1 dated Aug. 15, 2018.
AU-2017296234 Examination Report No. 1 dated Jul. 19, 2018.
AU-2017296234 Examination Report No. 2 dated Sep. 24, 2018.
AU-2017297625 Examination Report No. 1 dated Jul. 20, 2018.
AU-2017297625 Examination Report No. 2 dated Sep. 24, 2018.
AU-2017297629 Notice of Acceptance dated Jul. 26, 2018.
AU-2018256628 Examination Report No. 1 dated Jul. 1, 2019.
AU-2019200583 Examination Report No. 1 dated Oct. 17, 2019.
Choi et al., "Multiple-viewing-zone integral imaging using a dynamic barrier array for three-dimensional displays", Optics Express, vol. 11, No. 8, Apr. 21, 2003 (Apr. 21, 2003), p. 927.
CN201780043946.8 First Office Action of the Chinese Patent Office mailed Dec. 22, 2020.
CN201780043946.8 Second Office Action of the Chinese Patent Office mailed Sep. 15, 2021.
CN201780044006.0 First Office Action of the Chinese Patent Office mailed Dec. 16, 2020.
CN201780044008.X First Office Action of the Chinese Patent Office mailed Sep. 29, 2020.
CN201980018280.X First Office Action mailed Jun. 8, 2022.
CN201980018334.2 First Office Action of the Chinese Patent Office mailed Sep. 13, 2022.
Davis et al., "Simulation of Anderson localization in a random fiber using a fast Fresnel diffraction algorithm", Optical Engineering, Soc. of Photo-Optical Instrumentation Engineers, Bellingham, vol. 55, No. 6, Jun. 1, 2016 (Jun. 1, 2016), p. 66122.
EA-201892633 Office Action of the Eurasian Patent Office dated Aug. 10, 2020.
EA-201892637 Office Action of the Eurasian Patent Office dated Mar. 6, 2020.
EA-202193101 Notification of the Search Report of the Eurasian Patent Office dated Sep. 16, 2022.
EP-17828596.1 European Extended Search Report of European Patent Office dated Mar. 23, 2020.
EP-17828613.4 European Exam Report of European Patent Office dated Aug. 16, 2021.
EP-17828613.4 European Extended Search Report of European Patent Office dated Mar. 6, 2020.
EP-17828622.5 European Exam Report of European Patent Office dated Aug. 16, 2021.
EP-17828622.5 European Extended Search Report of European Patent Office dated Mar. 6, 2020.
EP-17828628.2 European Extended Search Report of European Patent Office dated Mar. 6, 2020.
EP-17828632.4 European Partial Search Report of European Patent Office dated Feb. 10, 2020.
EP-19738109.8 European Extended Search Report of European Patent Office dated Oct. 18, 2021.
EP-19738344.1 European Extended Search Report of European Patent Office dated Oct. 7, 2021.
EP-19738383.9 European Extended Search Report of European Patent Office dated Oct. 15, 2021.
Gerald L., "Size of Letters Required for Visibility as a Function of Viewing Distance and Observer Visual Acuity," U.S. Department of Commerce/National Bureau of Statistics, Jul. 1983.
International Preliminary Report on Patentability of PCT/US2017/042418 dated Mar. 25, 2019.
International Search Report and Written Opinion of PCT/US2017/042275 dated Dec. 4, 2017.
International Search Report and Written Opinion of PCT/US2017/042418 dated Dec. 20, 2017.
International Search Report and Written Opinion of PCT/US2017/042452 dated Nov. 17, 2017.
International Search Report and Written Opinion of PCT/US2017/042466 dated Nov. 28, 2017.
International Search Report and Written Opinion of PCT/US2017/042470 dated Dec. 28, 2017.
International Search Report and Written Opinion of PCT/US2019/013310 dated May 13, 2019.
International Search Report and Written Opinion of PCT/US2019/013399 dated Jun. 10, 2019.
International Search Report and Written Opinion of PCT/US2019/013552 dated May 2, 2019.
International Search Report and Written Opinion of PCT/US2021/010055 dated May 23, 2022.
JP2019-501428 Non-Final Notice of Reasons for Rejection from the Japan Patent Office mailed Aug. 3, 2021.
JP2019-501531 Non-Final Notice of Reasons for Rejection of the Japan Patent Office dated Sep. 24, 2021.
JP2019-501554 Final Notice of Reasons for Rejection of the Japan Patent Office dated Dec. 6, 2022.
JP2019-501554 Non-Final Notice of Reasons for Rejection of the Japan Patent Office dated Jun. 8, 2021.
JP2019-501554 Non-Final Notice of Reasons for Rejection of the Japan Patent Office dated Mar. 29, 2022.
JP2020-538912 Non-Final Notice of Reasons for Rejection from the Japan Patent Office mailed Dec. 6, 2022.
JP2020-538941 Non-Final Notice of Reasons for Rejection from the Japan Patent Office mailed Dec. 6, 2022.
JP2022-067992 Non-Final Notice of Reasons for Rejection from the Japan Patent Office mailed Mar. 14, 2023.
Karbasi et al., "Image transport using Anderson localized modes in disordered optical fibers", Proeedings of SPIE, IEEE, US, vol. 8992, Mar. 8, 2014 (Mar. 8, 2014), pp. 89920J-89920J.
CA-3030873 Office action dated Aug. 10, 2023.
KR-10-2019-7004588 Notice of Preliminary Rejection mailed Apr. 25, 2022.
Lewter, "Adjustable Slab Slump Molds—Electric Cone 6 & Other Ways w/ Clay", Oct. 2, 2017 (Oct. 2, 2017) pp. 1-3.
Mafi et al., "Anderson localisation in fibres", 2014 The European Conference on Optical Communication (ECOC), Systematic Paris Region Systems and Ict Cluster, Sep. 21, 2014 (Sep. 21, 2014), pp. 1-3.
Mafi, "Transverse Anderson localization of light: a tutorial", Advances in Optics and Photonics, vol. 7, No. 3, Sep. 30, 2015 (Sep. 30, 2015), p. 459.
NZ-743813 First Examination Report dated Sep. 14, 2018.
NZ-743822 Further Examination Report dated Jun. 11, 2019.
Smith, T.E., "Notebook for Spatial Data Analysis, Part I, Spatial Point Pattern Analysis", (2016) ESE 502, (http://www.seas.upenn.edu/~ese502/#notebook).
TW106123878 Office Action of the Taiwan Patent Office dated Nov. 15, 2021.

(56) References Cited

OTHER PUBLICATIONS

Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
JP2020-538912 Final Notice of Reasons for Rejection of the Japan Patent Office dated May 30, 2023.
JP2020-538941 Final Notice of Reasons for Rejection of the Japan Patent Office dated May 30, 2023.
JP2023-085177 Non-Final Notice of Reasons for Rejection of the Japan Patent Office dated May 21, 2024.
KR-10-2020-7023602 Notice of Preliminary Rejection mailed Apr. 18, 2024.
AU-2019206712 Examination Report No. 2 dated May 28, 2024.

SIDE VIEW

HIGH DENSITY ENERGY DIRECTING DEVICE

CROSS-REFERENCE TO RELATED APPLICATIONS

This application is a continuation of U.S. patent application Ser. No. 17/246,485 filed on Apr. 30, 2021, which is a continuation of U.S. patent application Ser. No. 16/694,772 filed on Nov. 25, 2019, which is a continuation of U.S. patent application Ser. No. 16/064,204 filed on Jun. 20, 2018, which is a 371 national stage application of International application PCT/US2017/042452 filed on Jul. 17, 2017, which claims benefit of U.S. provisional patent application No. 62/362,602 filed on Jul. 15, 2016, U.S. provisional patent application No. 62/366,076 filed on Jul. 24, 2016, U.S. provisional patent application No. 62/507,500 filed on May 17, 2017, International application PCT/US2017/042275 filed on Jul. 14, 2017 and International application PCT/US2017/042276 filed on Jul. 14, 2017, all of which are herein incorporated by reference in their entireties.

TECHNICAL FIELD

This disclosure is related to energy directing devices, and specifically to energy relays configured to direct high density energy through a mosaic surface with imperceptible seam gaps.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

In an embodiment, an energy directing device may comprise one or more energy locations and one or more energy relay elements, each of the one or more energy relay elements further comprising a first surface and a second surface. The second surfaces of each energy relay element may be arranged to form a singular seamless energy surface.

In an embodiment, a separation between edges of any two adjacent second surfaces of the singular seamless energy surface may be less than a minimum perceptible contour as defined by the visual acuity of a human eye having better than 20/40 vision at a distance, greater than the lesser of a height of the singular seamless energy surface or a width of the singular seamless energy surface, from the singular seamless energy surface.

In an embodiment, the one or more energy relay elements may be configured to direct energy along energy propagation paths which extend between the one or more energy locations and the singular seamless energy surface.

In an embodiment, the singular seamless energy surface may be a virtual surface.

In an embodiment, energy may be directed through the one or more energy relay elements with zero magnification, non-zero magnification, or non-zero minification.

In an embodiment, the singular seamless energy surface may be planar, faceted, or curved.

In an embodiment, a quantity of the one or more energy relay elements and a quantity of the one or more energy locations may define a mechanical dimension of the energy directing device.

In an embodiment, the one or more energy relay elements may be configured to relay accepted focused light, the accepted focused light having a first resolution, while retaining a relayed resolution of the accepted focused light no less than 50% of the first resolution.

In an embodiment, an energy directing device comprises one or more energy locations and one or more energy relay element stacks. Each energy relay element stack comprises one or more energy relay elements, and each energy relay element comprising a first side and a second side. Each energy relay element may be configured to direct energy therethrough.

In an embodiment, the second sides of terminal energy relay elements of each energy relay element stack may be arranged to form a singular seamless energy surface.

In an embodiment, the one or more energy relay element stacks may be configured to direct energy along energy propagation paths which extend between the one or more energy locations and the singular seamless energy surfaces.

In an embodiment, a separation between the edges of any two adjacent second surfaces of the terminal energy relay elements may be less than a minimum perceptible contour as defined by the visual acuity of a human eye having better than 20/40 vision at a distance, greater than the lesser of a height of the singular seamless energy surface or a width of the singular seamless energy surface, from the singular seamless energy surface.

In an embodiment, the energy relay elements of each energy relay element stack arranged in an end-to-end configuration;

In an embodiment, an energy system comprises one or more energy devices, and one or more energy components each made from elements that induce transverse Anderson Localization of energy transport therethrough, and each energy component further comprising a first energy surface and a second energy surface.

In an embodiment, the second energy surface of each energy component may be arranged to form a singular seamless energy surface.

In an embodiment, the one or more energy devices may be operable to at least emit or receive energy through the singular seamless energy surface.

In an embodiment, a separation between edges of any two adjacent second energy surfaces of the one or more energy components may be less than a minimum perceptible contour as defined by the visual acuity of a human eye having better than 20/40 vision at a distance, greater than the lesser of a singular seamless energy surface height or a singular seamless energy surface width, from the singular seamless energy surface.

These and other advantages of the present disclosure will become apparent to those skilled in the art from the following detailed description and the appended claims.

DETAILED DESCRIPTION

Figure 1:
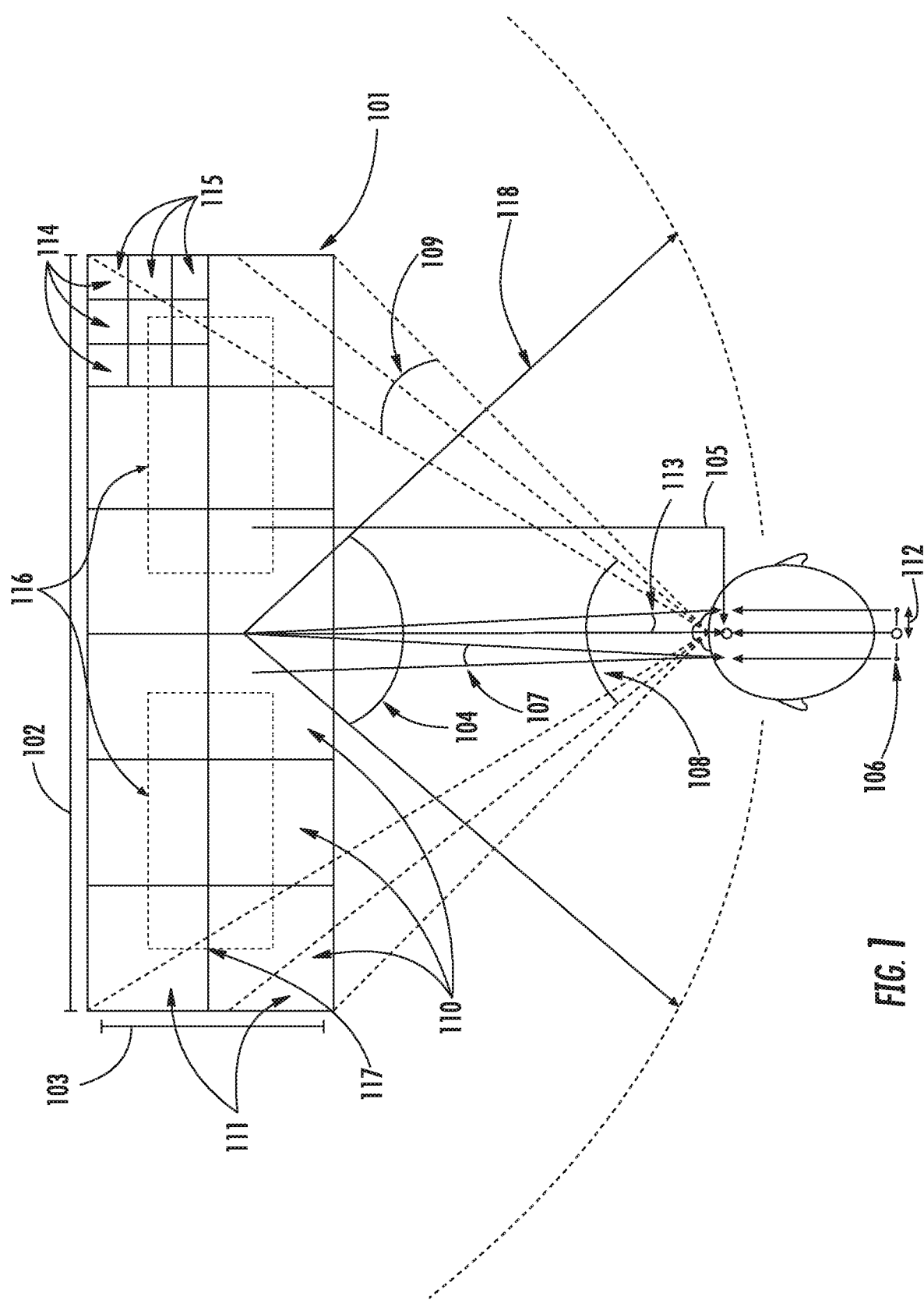
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bidirectional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not be practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/− 60 degrees about the center of the display), desired intermediate samples at a distance (e.g., one additional converged propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{Wid\ (W)}{Hei\ (H)}$$

$$\text{Surface Horizontal Size} = \text{Surface Diagonal} * \left(\frac{1}{\sqrt{1+\left(\frac{H}{W}\right)^2}}\right)$$

$$\text{Surface Vertical Size} = \text{Surface Diagonal} * \left(\frac{1}{\sqrt{1+\left(\frac{W}{H}\right)^2}}\right)$$

$$\text{Horizontal Field of View} = 2 * \operatorname{atan}\left(\frac{\text{Surface Horizontal Size}}{2 * \text{Seating Distance}}\right)$$

$$\text{Vertical Field of View} = 2 * \operatorname{atan}\left(\frac{\text{Surface Verticle Size}}{2 * \text{Seating Distance}}\right)$$

$$\text{Horizontal Element Resolution} = \text{Horizontal } FoV * \frac{60}{\text{Eye Resolution}}$$

$$\text{Vertical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocula Distance}}{(\text{Number of Desired Intermediate Samples} + 1)}$$

$$\text{Angular Sampling} = \operatorname{atan}\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
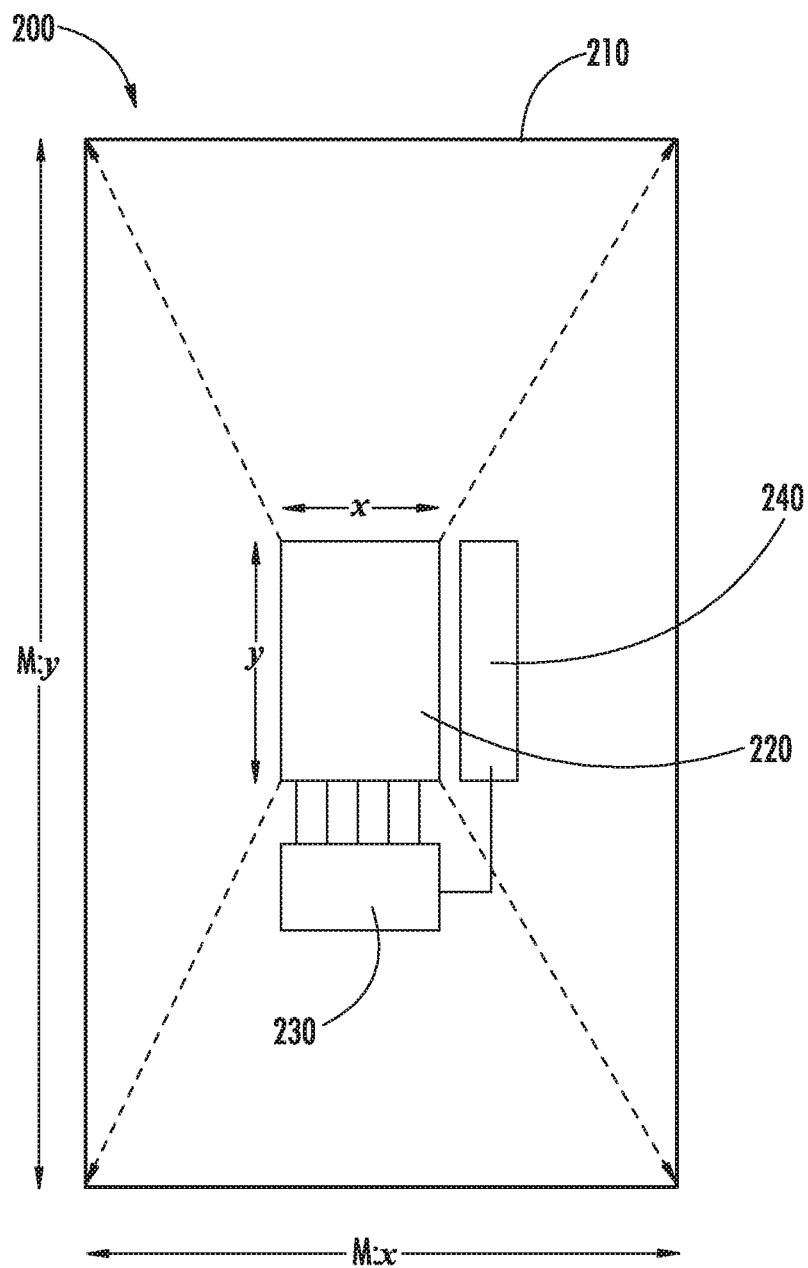
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices comprise of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
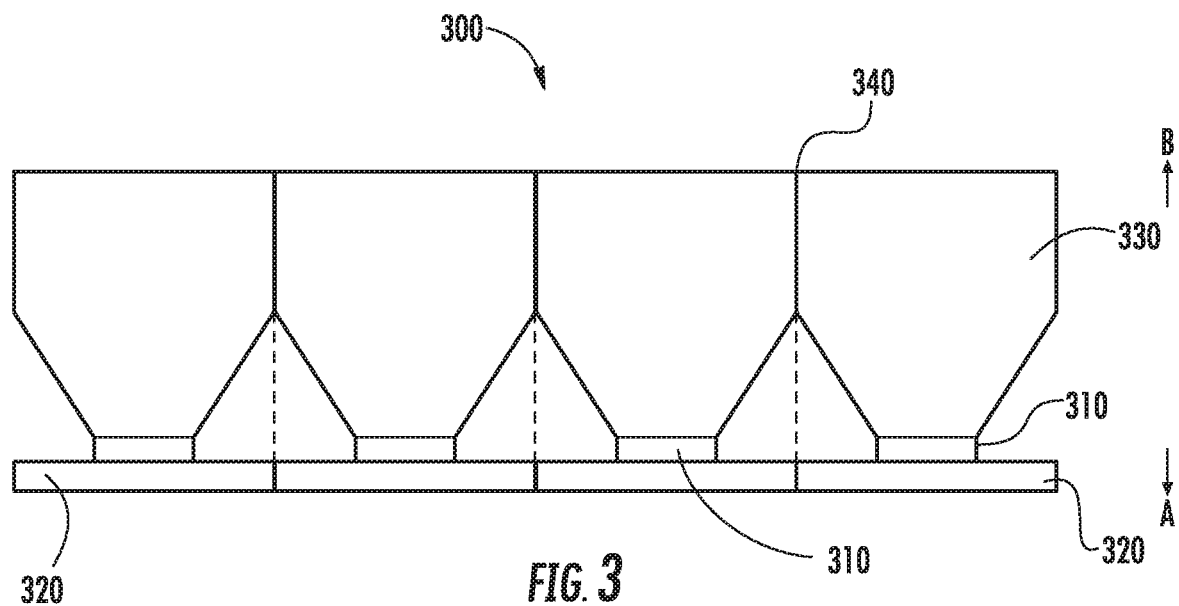
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
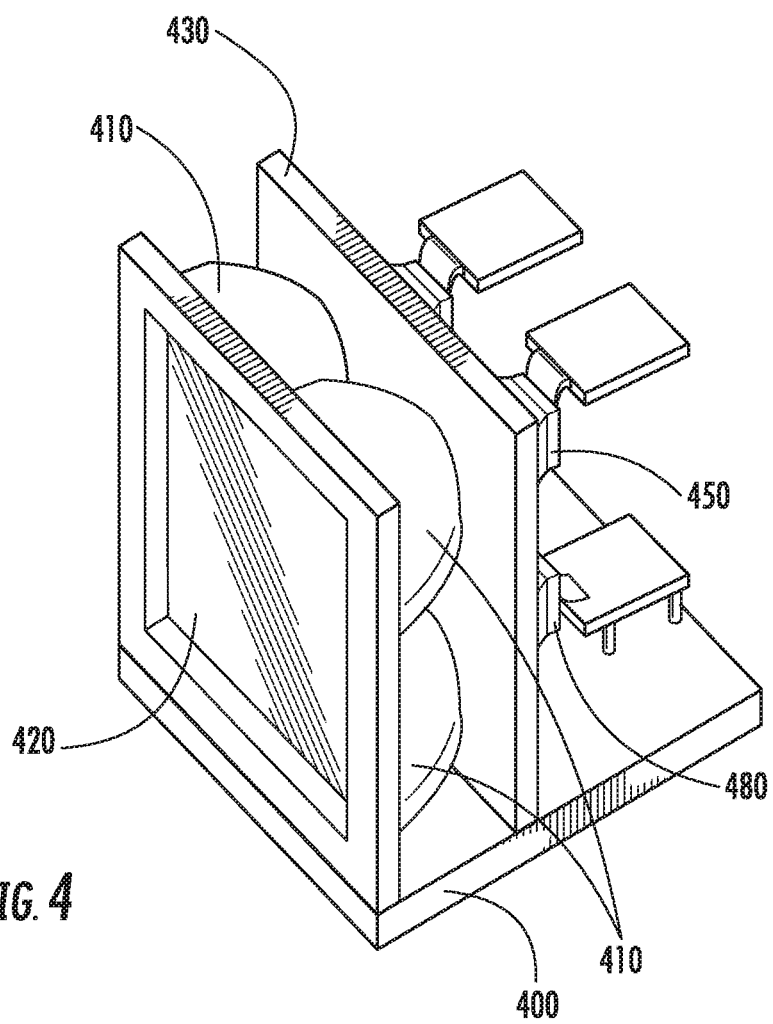
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second surfaces of the terminal energy relay elements is less than the minimum perceptible contour as defined by the visual acuity of a human eye having better than 20/100 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/− 10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bidirectional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figures 5A, 5B:
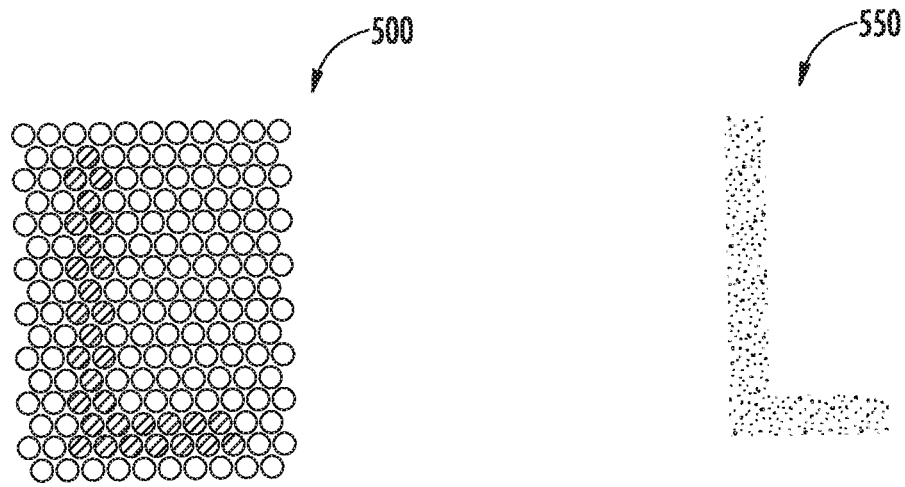
FIG. 5A is a schematic diagram illustrating an example of a relayed image through multi-core optical fibers.
FIG. 5B is a schematic diagram illustrating an example of a relayed image through an optical relay that exhibits the properties of the Transverse Anderson Localization principle.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bidirectional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
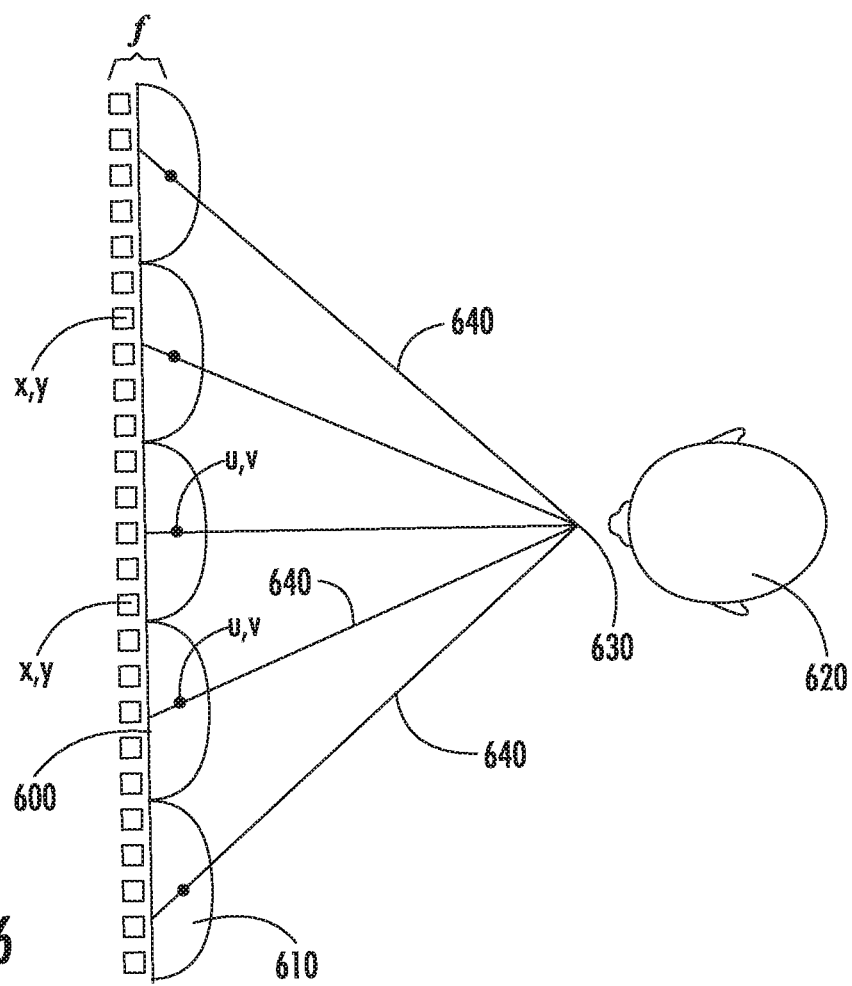
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due to designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bidirectional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Seamless Energy Surface Systems to Stimulate Human Sensory Receptors Within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bidirectional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregate tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bidirectionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bidirectional energy propagation and aggregated surfaces are possible.

In an embodiment, the system comprises an energy waveguide capable of bidirectional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bidirectional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bidirectional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bidirectional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

High Density Energy Directing Device

In an embodiment, an energy directing device may comprise one or more energy locations and one or more energy relay elements, each of the one or more energy relay elements further comprising a first surface and a second surface. The second surfaces of each energy relay element may be arranged to form a singular seamless energy surface.

In embodiments of the present disclosure, the one or more energy locations may comprise a display technology including any of:
  a) LCD, LED, laser, CRT, OLED, AMOLED, TOLED, pico projector, single chip, 3-chip, LCoS, DLP, Quantum Dots, monochrome, color, projection, backlit, directly emissive, reflective, transparent, opaque, coherent, incoherent, diffuse, direct, or any other illumination source sufficient to produce the desired pixel density; and
  b) wherein any reflective display technology may be directly bonded to the optical relay to provide an outdoor or ambient illumination display, and further, combined with other materials allows for the interaction of light with the relayed content for both 2D and light field applications; and
  c) a series of beamsplitters, prisms, or polarized elements and arranging each of the above devices within the optical system to provide a virtual energy surface that aggregates to include a completely seamless integration of all of the active area between the one or more devices even in consideration of the mechanical envelopes; and
  d) a series of parallel, converged, optically offset parallel and converged, on-axis, off-axis, radial, aligned or otherwise reflective or projection systems, each including a specified resolution and mechanical envelope but projecting onto a surface that is in aggregate smaller than the side-by-side footprint of all of the one or more reflective or projection systems combined.

In an embodiment, a separation between edges of any two adjacent second surfaces of the singular seamless energy surface may be less than a minimum perceptible contour as defined by the visual acuity of a human eye having better than 20/40 vision at a distance, greater than the lesser of a height of the singular seamless energy surface or a width of the singular seamless energy surface, from the singular seamless energy surface.

Creating a seamless energy surface from a plurality of separate independent energy sources presents a problem of significant seams between the active areas of the energy sources.

Figure 7:
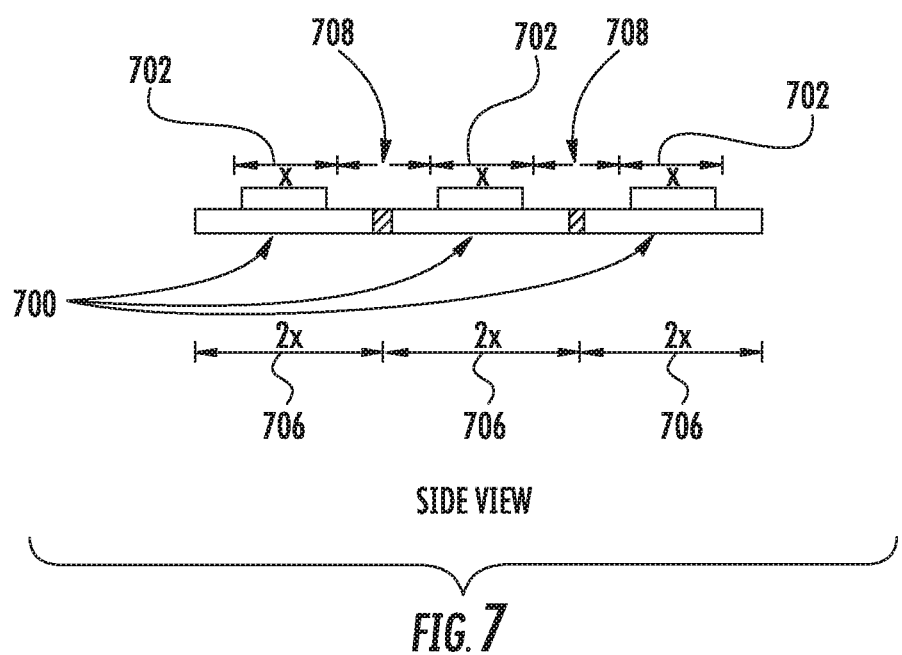
FIG. 7 illustrates a side view of three display devices which each comprise an active display area dimension and a mechanical envelope.

For example, for visible electromagnetic energy, FIG. 7 represents an example of the minimum separation possible between identical independent displays when mounted on flex cables. FIG. 7 illustrates a side view of three display devices 700, which each comprise an active display area dimension 702 and a mechanical envelope 706. Minimum gaps 708 highlight the minimum possible space between any two active imaging surfaces 702 of display devices 700. In the event that the active image to mechanical envelope ratio is less than 2:1 (e.g. the active area is 20 mm×10 mm and the mechanical envelope is less than 40 mm×10 mm), it is possible to use beam splitters or other similar optical and reflective materials to interleave two image surfaces to form one single contiguous plane.

Figure 8:
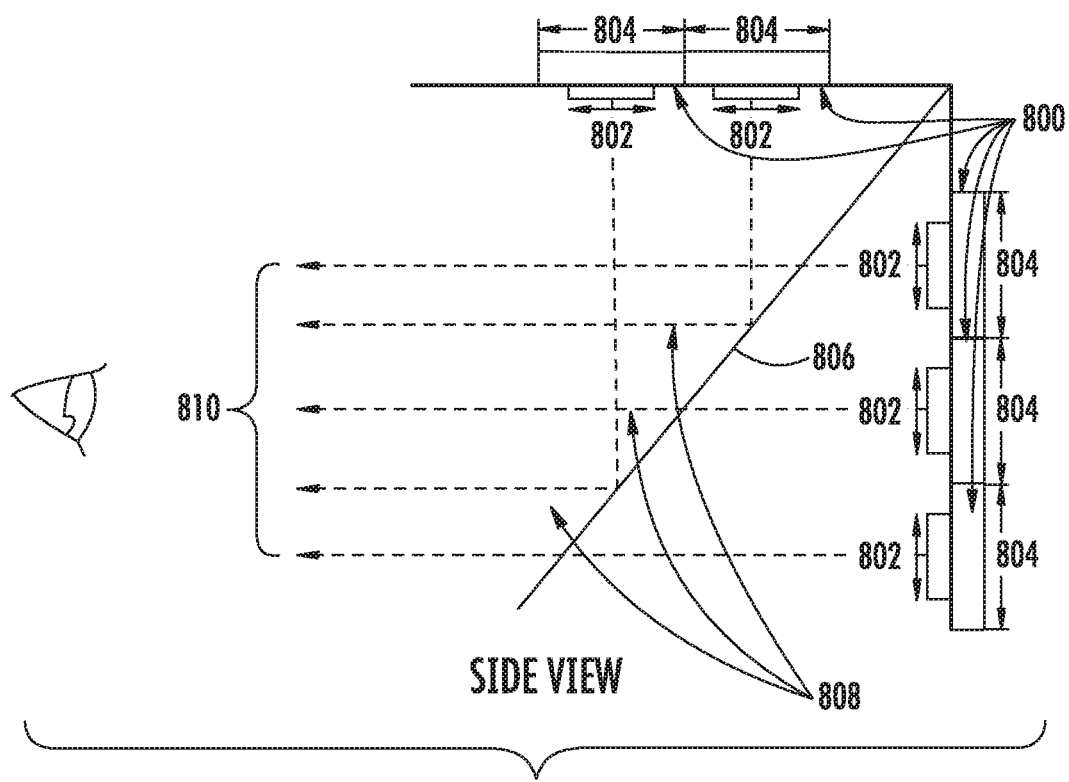
FIG. 8 features five display devices which each comprise active display areas and mechanical envelopes, used with a beam splitter.

FIG. 8 is a side view illustration which describes one such implementation of this methodology. FIG. 8 features five display devices 800 which each comprise active display areas 802 and mechanical envelopes 804. Beam splitter 806 combines image light 808 produced by display devices 800 into a seamless image presentation 810, which effectively masks the mechanical envelopes 804 of the display devices 800. It should be noted that a highly non-reflective dark surface is preferable at or near the display to mask out the non-image areas in order to avoid reflection of the electronics and other non-display regions.

Figure 9:
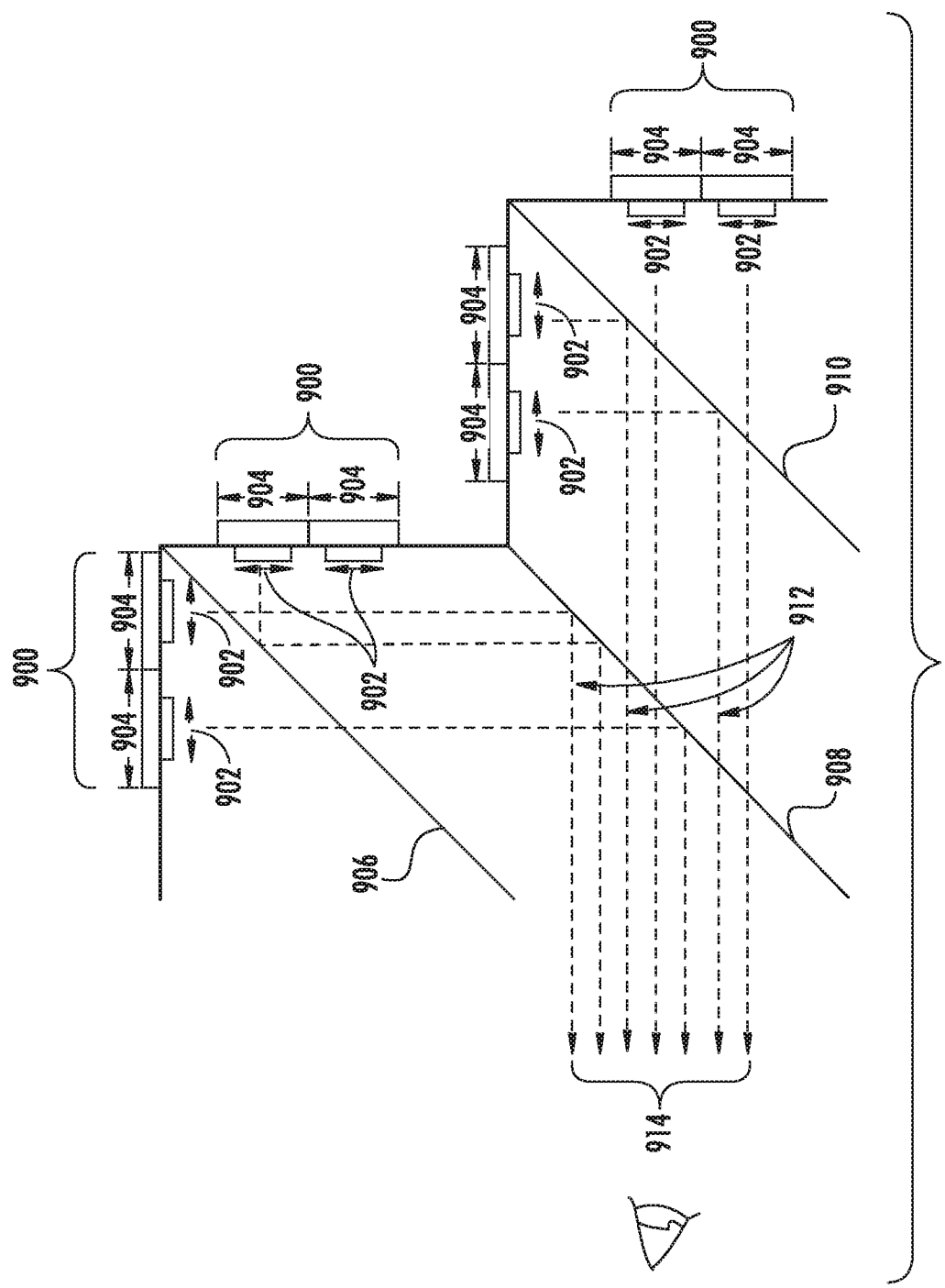
FIG. 9 is a side view illustration of a methodology where 3 beam splitters are leveraged to accommodate a mechanical envelope.

FIG. 9 is a side view illustration of a second methodology where 3 beam splitters are leveraged to accommodate a mechanical envelope that is a 4:1 ratio. FIG. 9 features eight display devices 900 which each comprise active display areas 902 and mechanical envelopes 904. Three beam splitters 906, 908, and 910 combine image light 912 produced by the eight display devices 900 into a seamless image presentation 914, which effectively masks the mechanical envelopes 904 of the display devices 900.

It should be noted that while these methods can work, the mechanical accuracy may preferably be near perfect to avoid incorrect angular viewing of each overlapping display plane and the overall viewed brightness will decrease by the amount of light that is absorbed by the beam splitter in order to redirect the rays of light to each discreet reflected plane. In FIG. 9, the brightness of image light 912 will only transmit at best 25% of actual display peak potential from display devices 900 due to the loss of light from the overall system. Additionally, it should be noted that the size of the physical apparatus with multiple reflections becomes quite large very quickly depending on the size of the desired image surface.

It is also possible to consider projection technologies to aggregate multiple images into a larger overall display, however, this comes at the cost of great complexity for throw distance, minimum focus, optical quality, thermal consistency considerations over a temperature gradient over time, as well as image blending, alignment, size and form factor. For most practical applications, hosting tens or hundreds of these projection sources results in a design that is much larger and less reliable. With all of the above risks noted, all of the descriptions contained herein may also apply to any form of projection technology in addition to the disclosed panel methodologies.

An alternative methodology involves using many projectors in a tiled fashion to produce a seamless image surface in combination with a rear projection surface. This surface may include screens, diffusers, and optical relays in planar or non-planar surfaces. The regions between each individually addressed tile should ideally overlap slightly and blend the transition between each tile appropriately, although not explicitly required. The same concept of image area to mechanical envelope applies with some added complexity. We now introduce the concepts of maximum optical offset along image surface position which can be controlled by moving the optics of the projection system independently from that of the image source resulting in a non-keystoned shift of the image to the energy surface. High quality optics are desired for this to be successful and is often limited to less than the width of the projected image.

Additionally, when not using orthographic or collimated designs, we now have the challenge of minimum focus of the optics contained within the projection system. This can be addressed by increasing the overall projected image size per tile at the consequence of increasing the viewed distance to provide the desired pixel density as notated above.

Figure 10:
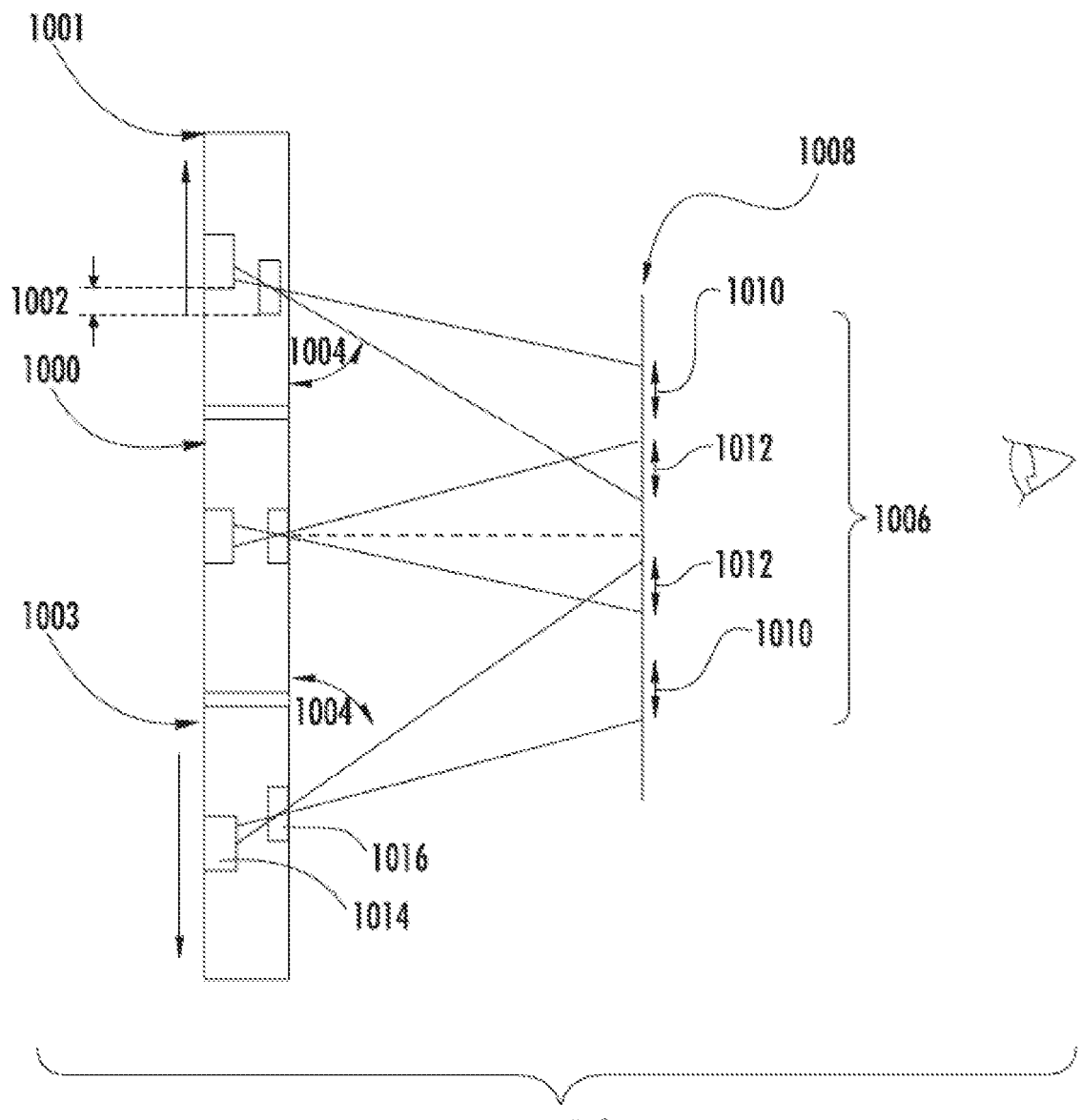
FIG. 10 highlights this relationship between the mechanical envelope ratio, the minimum focus distance and the maximum image offset as well as the percent of overlap between individual tiled images.

FIG. 10 highlights this relationship between the mechanical envelope ratio, the minimum focus distance and the maximum image offset as well as the percent of overlap between individual tiled images. FIG. 10 illustrates a top view of an embodiment with three projection devices: one centered projection device 1000, and two off-centered projection devises 1001, 1003. The mechanical envelope of each projection device 1000, 1001, 1003 creates a display offset which invites adjustment of the projection angle 1004 of each off-centered projection device 1001, 1003. FIG. 10 highlights the use of off-axis projection optics, where the display panel 1014 is displaced from the optical axis of the display lens 1016 by an amount 1002 in proportion to the display panel distance from the center of the array, allowing for the overlap of each of these images while maintaining a parallel array structure, and additionally avoid a keystone image correction. Image light projected from the projection devices 1000, 1001, 1003 forms a display image 1006 at image plane 1008. Image light from off-centered projection device 1001, 1003 will have an image offset 1010 and a fractional overlap 1012 at the image plane 1008.

In an embodiment, the singular seamless energy surface may be planar, faceted, or curved. It is also possible to form an arc of projectors at the expense of requiring keystone correction optically or computationally to form the singular energy surface. In an embodiment, three projection devices may be arranged in an arc. The projection devices may produce image light which propagates through a planar image plane. The image light may experience keystone effects.

Figure 11:
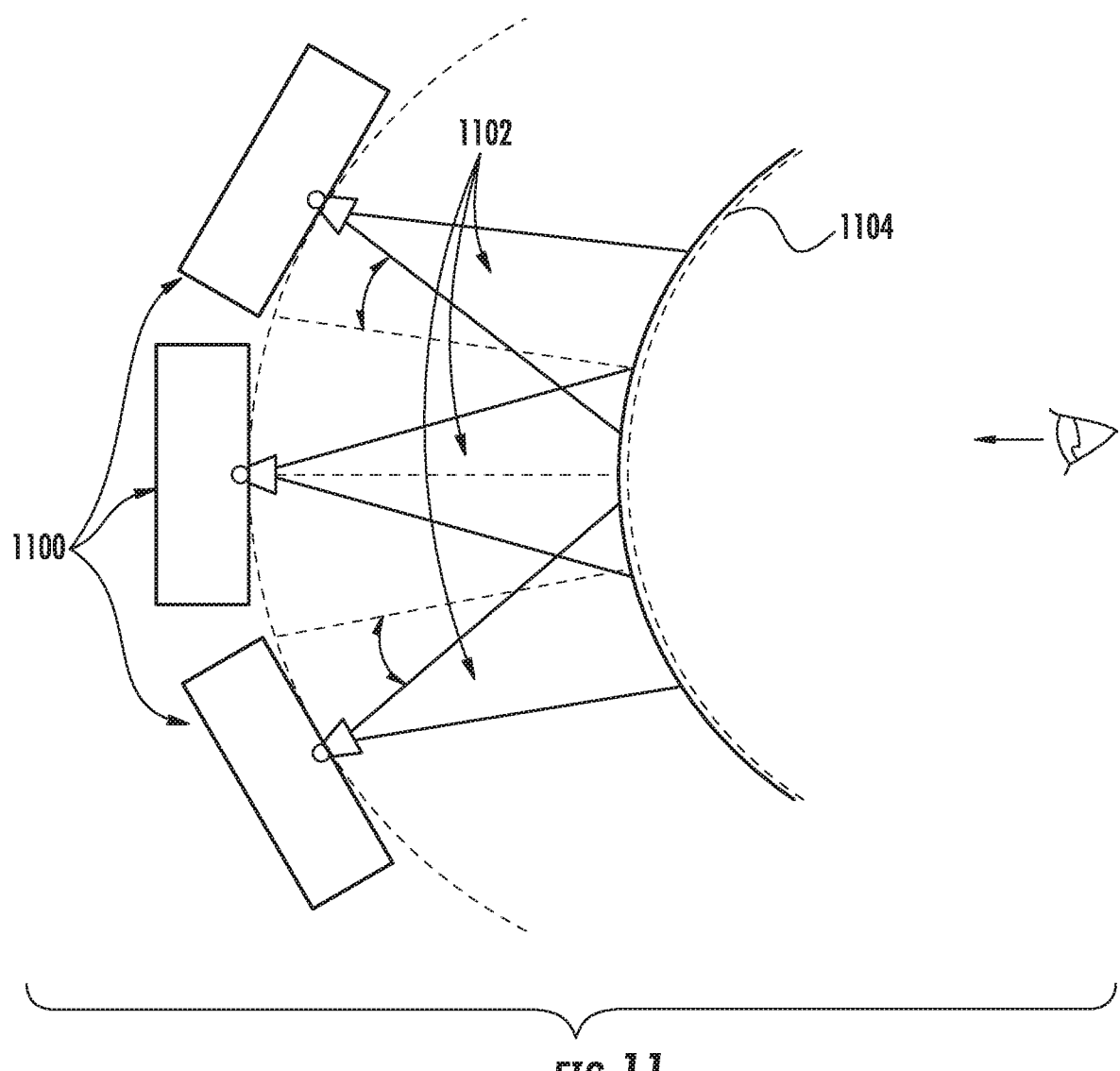
FIG. 11 is a top view illustration of an embodiment with three projection devices arranged in an arc.

Alternatively, non-planar surfaces may be designed in order to place each projector directly behind the corresponding tile of viewed energy surface. FIG. 11 is a top view illustration of an embodiment with three projection devices 1100 arranged in an arc. The projection devices 1100 produce image light 1102 which propagates through non-planar surface 1104. Image light 1102 may experience keystone effects that the embodiment of FIG. 10 avoids. For both of these approaches, the projectors do not necessarily need to be in a physically stacked configuration and may leverage reflectors or other optical methodologies in order to provide application specific mechanical designs.

Any combination of these approaches may be employed where both beam splitters and projection technologies can be leveraged simultaneously.

An additional embodiment of the system makes use of recent breakthroughs in energy relay technologies.

Tapered Energy Relays

In order to further solve the challenge of generating high resolution from an array of individual energy wave sources containing extended mechanical envelopes, the use of tapered energy relays can be employed to increase the effective size of each energy source. An array of tapered energy relays can be stitched together to form a singular contiguous energy surface, circumventing the limitation of mechanical requirements for those energy sources.

In an embodiment, the one or more energy relay elements may be configured to direct energy along propagation paths which extend between the one or more energy locations and the singular seamless energy surface.

For example, if an energy wave source's active area is 20 mm×10 mm and the mechanical envelope is 40 mm×20 mm, a tapered energy relay may be designed with a magnification of 2:1 to produce a taper that is 20 mm×10 mm (when cut) on the minified end and 40 mm×20 mm (when cut) on the magnified end, providing the ability to align an array of these tapers together seamlessly without altering or violating the mechanical envelope of each energy wave source.

Figure 12:
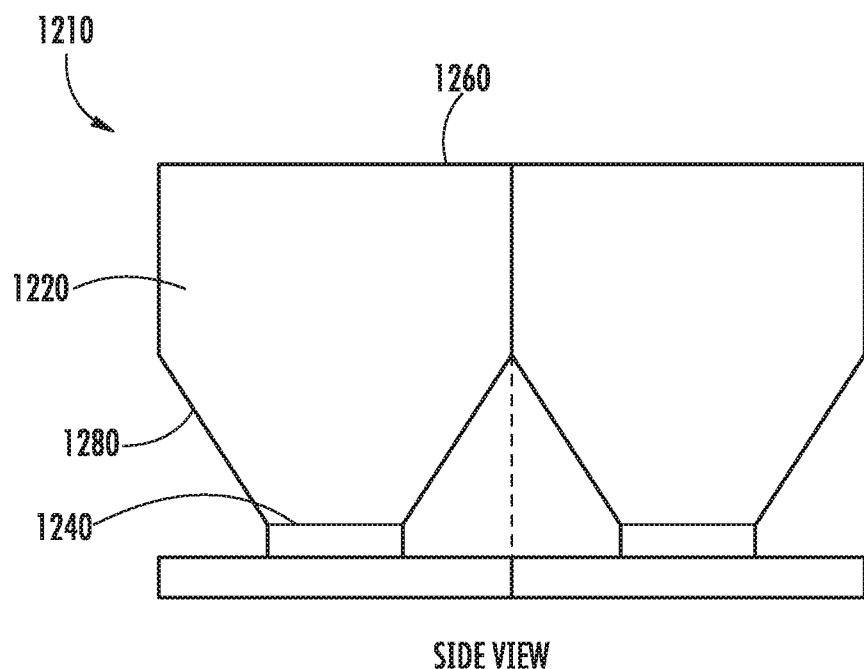
FIG. 12 illustrates a tapered energy relay mosaic arrangement.

FIG. 12 illustrates an orthogonal view of one such tapered energy relay mosaic arrangement 1210, in accordance with one embodiment of the present disclosure. In FIG. 12, the relay device 1210 may include two or more relay elements 1220, each relay element 1220 formed of one or more structures, each relay element 1220 having a first surface 1240, a second surface 1260, a transverse orientation (generally parallel to the surfaces 1240, 1260) and a longitudinal orientation (generally perpendicular to the surfaces 1240, 1260). The surface area of the first surface 1240 may be different than the surface area of the second surface 1260. For relay element 1220, the surface area of the first surface 1240 is less than the surface area of the second surface 1260. In another embodiment, the surface area of the first surface 1240 may be the same or greater than the surface area of the second surface 1260. Energy waves can pass from the first surface 1240 to the second surface 1260, or vice versa.

In FIG. 12, the relay element 1220 of the relay element device 1210 includes a sloped profile portion 1280 between the first surface 1240 and the second surface 1260. In operation, energy waves propagating between the first surface 1240 and the second surface 1260 may have a higher transport efficiency in the longitudinal orientation than in the transverse orientation, and energy waves passing through the relay element 1220 may result in spatial magnification or spatial de-magnification. In other words, energy waves passing through the relay element 1220 of the relay element device 1210 may experience increased magnification or decreased magnification. In an embodiment, energy may be directed through the one or more energy relay elements with zero magnification. In some embodiments, the one or more structures for forming relay element devices may include glass, carbon, optical fiber, optical film, plastic, polymer, or mixtures thereof.

In one embodiment, the energy waves passing through the first surface have a first resolution, while the energy waves passing through the second surface have a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In some embodiments, the first surface may be configured to receive energy from an energy wave source, the energy wave source including a mechanical envelope having a width different than the width of at least one of the first surface and the second surface.

In an embodiment, energy may be transported between first and second surfaces which defines the longitudinal orientation, the first and second surfaces of each of the relays extends generally along a transverse orientation defined by the first and second directions, where the longitudinal orientation is substantially normal to the transverse orientation. In an embodiment, energy waves propagating through the plurality of relays have higher transport efficiency in the longitudinal orientation than in the transverse orientation and are spatially localized in the transverse plane due to randomized refractive index variability in the transverse orientation coupled with minimal refractive index variation in the longitudinal orientation via the principle of Transverse Anderson Localization. In some embodiments, where each relay is constructed of multicore fiber, the energy waves propagating within each relay element may travel in the longitudinal orientation determined by the alignment of fibers in this orientation.

Mechanically, these tapered energy relays are cut and polished to a high degree of accuracy before being bonded or fused together in order to align them and ensure the smallest possible seam gap between the relays. The seamless surface formed by the second surfaces of energy relays is polished after the relays are bonded. In one such embodiment, using an epoxy that is thermally matched to the taper material, it is possible to achieve a maximum seam gap of 50 um. In another embodiment, a manufacturing process that places the taper array under compression and/or heat provides the ability to fuse the elements together. In another embodiment, the use of plastic tapers can be more easily chemically fused or heat-treated to create the bond without additional bonding. For the avoidance of doubt, any methodology may be used to bond the array together, to explicitly include no bond other than gravity and/or force.

In an embodiment, a separation between the edges of any two adjacent second surfaces of the terminal energy relay elements may be less than a minimum perceptible contour as defined by the visual acuity of a human eye having better than 20/40 vision at a distance from the seamless energy surface that is greater than the lesser of a height of the singular seamless energy surface or a width of the singular seamless energy surface.

A mechanical structure may be preferable in order to hold the multiple components in a fashion that meets a certain tolerance specification. In some embodiments, the first and second surfaces of tapered relay elements can have any polygonal shapes including without limitation circular, elliptical, oval, triangular, square, rectangle, parallelogram, trapezoidal, diamond, pentagon, hexagon, and so forth. In some examples, for non-square tapers, such as rectangular tapers for example, the relay elements may be rotated to have the minimum taper dimension parallel to the largest dimensions of the overall energy source. This approach allows for the optimization of the energy source to exhibit the lowest rejection of rays of light due to the acceptance cone of the magnified relay element as when viewed from center point of the energy source. For example, if the desired energy source size is 100 mm by 60 mm and each tapered energy relay is 20 mm by 10 mm, the relay elements may be aligned and rotated such that an array of 3 by 10 taper energy relay elements may be combined to produce the desired energy source size. Nothing here should suggest that an array with an alternative configuration of an array of 6 by 5 matrix, among other combinations, could not be utilized. The array comprising of a 3×10 layout generally will perform better than the alternative 6×5 layout.

Energy Relay Element Stacks

While the most simplistic formation of an energy source system comprises of an energy source bonded to a single tapered energy relay element, multiple relay elements may be coupled to form a single energy source module with increased quality or flexibility. One such embodiment includes a first tapered energy relay with the minified end attached to the energy source, and a second tapered energy relay connected to the first relay element, with the minified end of the second optical taper in contact with the magnified end of the first relay element, generating a total magnification equal to the product of the two individual taper magnifications. This is an example of an energy relay element stack comprising of a sequence of two or more energy relay elements, with each energy relay element comprising a first side and a second side, the stack relaying energy from the first surface of the first element to the second surface of the last element in the sequence, also named the terminal surface. Each energy relay element may be configured to direct energy therethrough.

In an embodiment, an energy directing device comprises one or more energy locations and one or more energy relay element stacks. Each energy relay element stack comprises one or more energy relay elements, with each energy relay element comprising a first surface and a second surface. Each energy relay element may be configured to direct energy therethrough. In an embodiment, the second surfaces of terminal energy relay elements of each energy relay element stack may be arranged to form a singular seamless display surface. In an embodiment, the one or more energy relay element stacks may be configured to direct energy along energy propagation paths which extend between the one or more energy locations and the singular seamless display surfaces.

Figure 13:
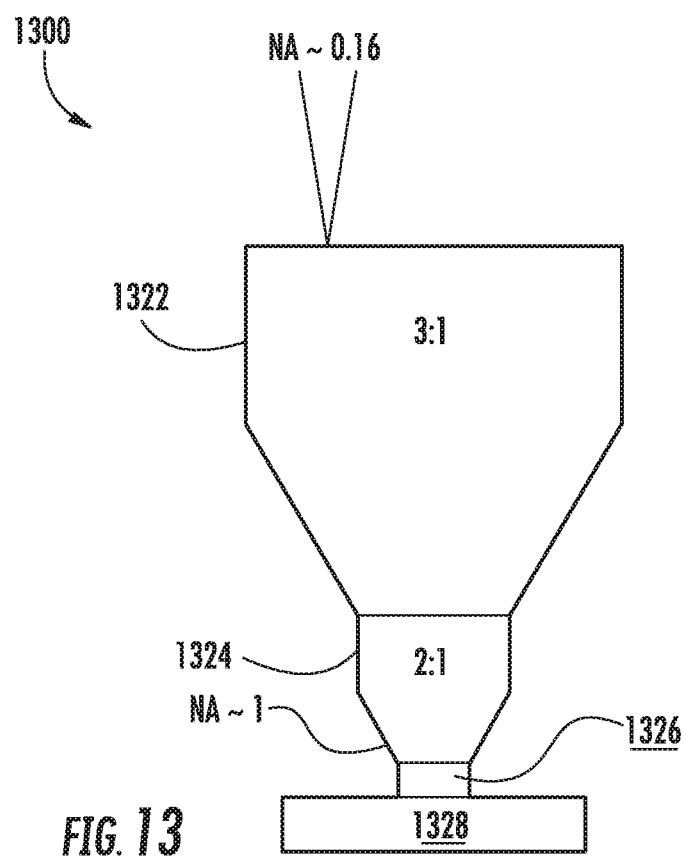
FIG. 13 illustrates a side view of an energy relay element stack comprising of two compound optical relay tapers in series.

FIG. 13 illustrates a side view of an energy relay element stack 1300 consisting of two compound optical relay tapers 1322, 1324 in series, both tapers with minified ends facing an energy source surface 1326, in accordance with an embodiment of the present disclosure. In FIG. 13, the input numerical aperture (NA) is 1.0 for the input of taper 1324, but only about 0.16 for the output of taper 1322. Notice that the output numerical aperture gets divided by the total magnification of 6, which is the product of 2 for taper 1324, and 3 for taper 1322. One advantage of this approach is the ability to customize the first energy wave relay element to account for various dimensions of energy source without alteration of the second energy wave relay element. It additionally provides the flexibility to alter the size of the output energy surface without changing the design of the energy source or the first relay element. Also shown in FIG. 13 is the energy source 1326 and the mechanical envelope 1328 containing the energy source drive electronics.

In an embodiment, the first surface may be configured to receive energy waves from an energy source unit (e.g., 1326), the energy source unit including a mechanical envelope having a width different than the width of at least one of the first surface and the second surface. In one embodiment, the energy waves passing through the first surface may have a first resolution, while the energy waves passing through the second surface may have a second resolution, such that the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In one embodiment, the plurality of energy relay elements in the stacked configuration may include a plurality of faceplates (relays with unity magnification). In some embodiments, the plurality of faceplates may have different lengths or are loose coherent optical relays. In other embodiments, the plurality of elements may have sloped profile portions similar to that of FIG. 12, where the sloped profile portions may be angled, linear, curved, tapered, faceted or aligned at a non-perpendicular angle relative to a normal axis of the relay element. In yet another embodiment, energy waves propagating through the plurality of relay elements have higher transport efficiency in the longitudinal orientation than in the transverse orientation and are spatially localized in the transverse orientation due to randomized refractive index variability in the transverse orientation coupled with minimal refractive index variation in the longitudinal orientation. In embodiments where each energy relay is constructed of multicore fiber, the energy waves propagating within each relay element may travel in the longitudinal orientation determined by the alignment of fibers in this orientation.

Energy Directing Device

Figure 14:
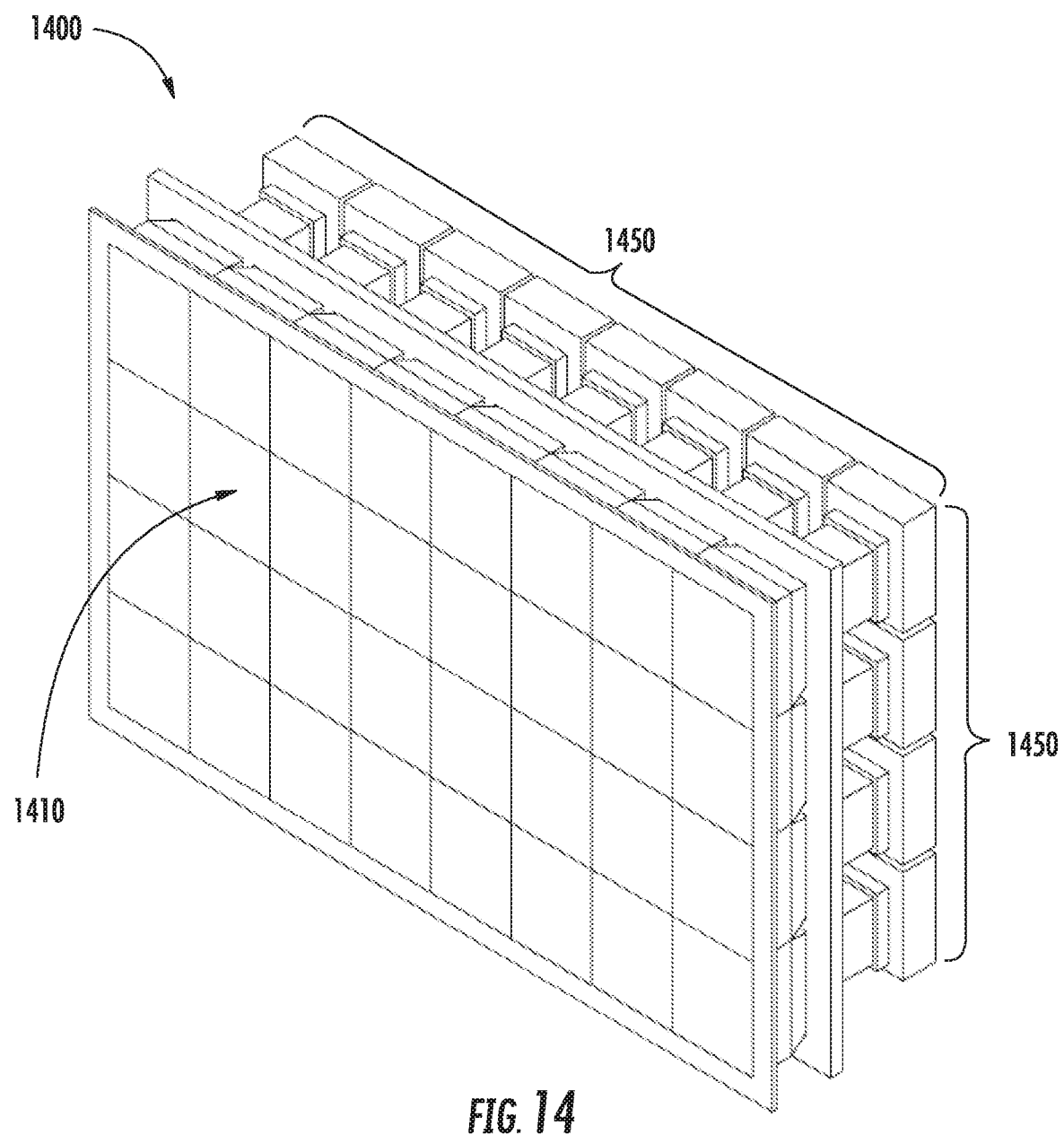
FIG. 14 illustrates a perspective view of an embodiment of an energy directing device where energy relay element stacks are arranged in an 8×4 array to form a singular seamless energy directing surface.

FIG. 14 illustrates a perspective view of an embodiment 1400 of an energy directing device where energy relay element stacks are arranged in an 8×4 array to form a singular seamless energy directing surface 1410 with the shortest dimension of the terminal surface of each tapered energy relay element stack parallel to the longest dimension of the energy surface 1410. The energy originates from 32 separate energy sources 1450, each bonded or otherwise attached to the first element of the energy relay element stacks.

In an embodiment, a separation between the edges of any two adjacent second surfaces of the terminal energy relay elements may be less than a minimum perceptible contour as defined by the visual acuity of a human eye having better than 20/100 vision at a distance, greater than the lesser of a height of the singular seamless display surface or a width of the singular seamless display surface, from the singular seamless display surface.

Figure 15:
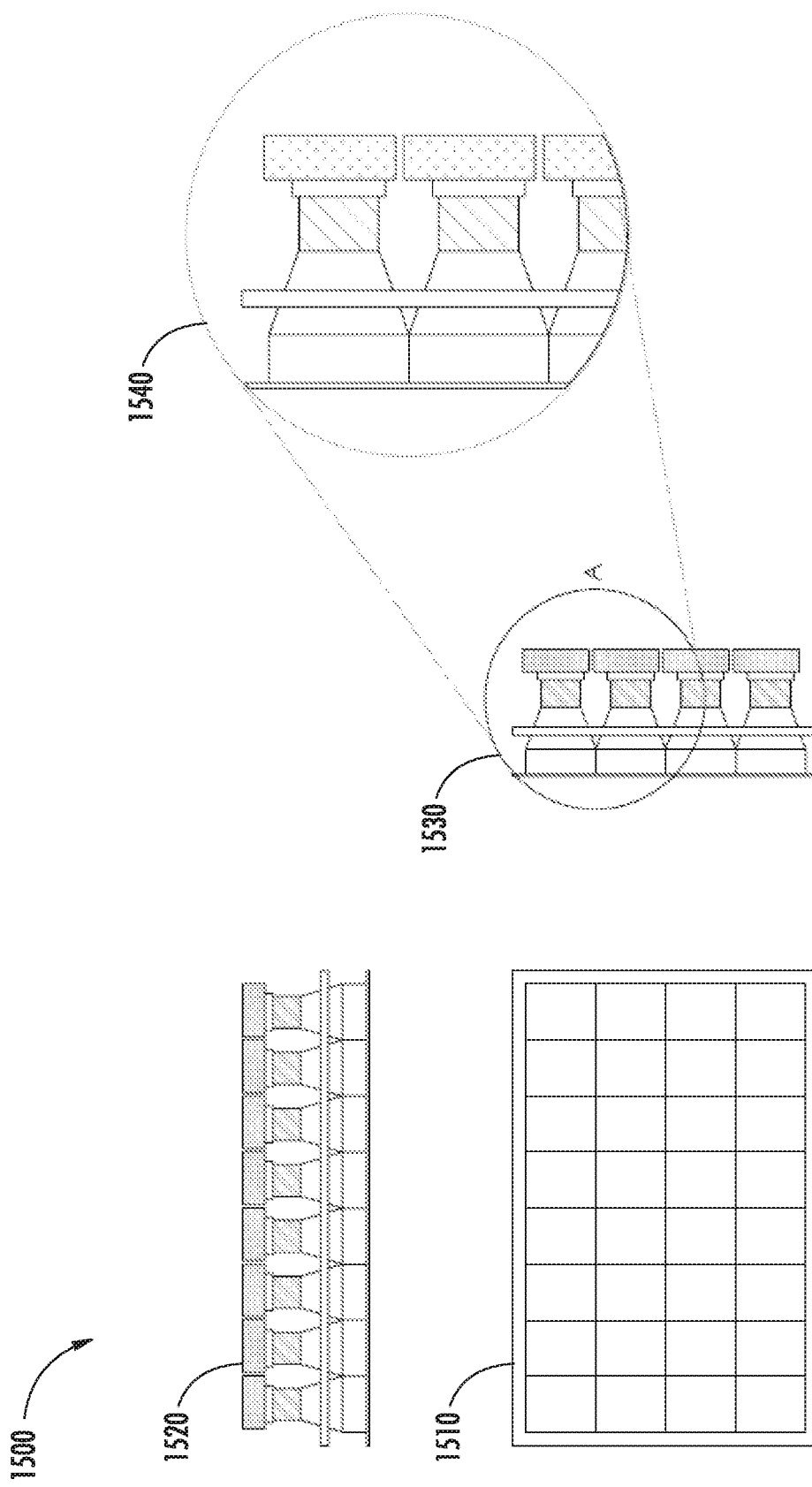
FIG. 15 contains several views of an energy directing device.

FIG. 15 contains an illustration 1500 of the following views of embodiment 1400: a front view 1510, a top view 1520, a side view 1530, and a close-up side view 1540.

Figure 16:
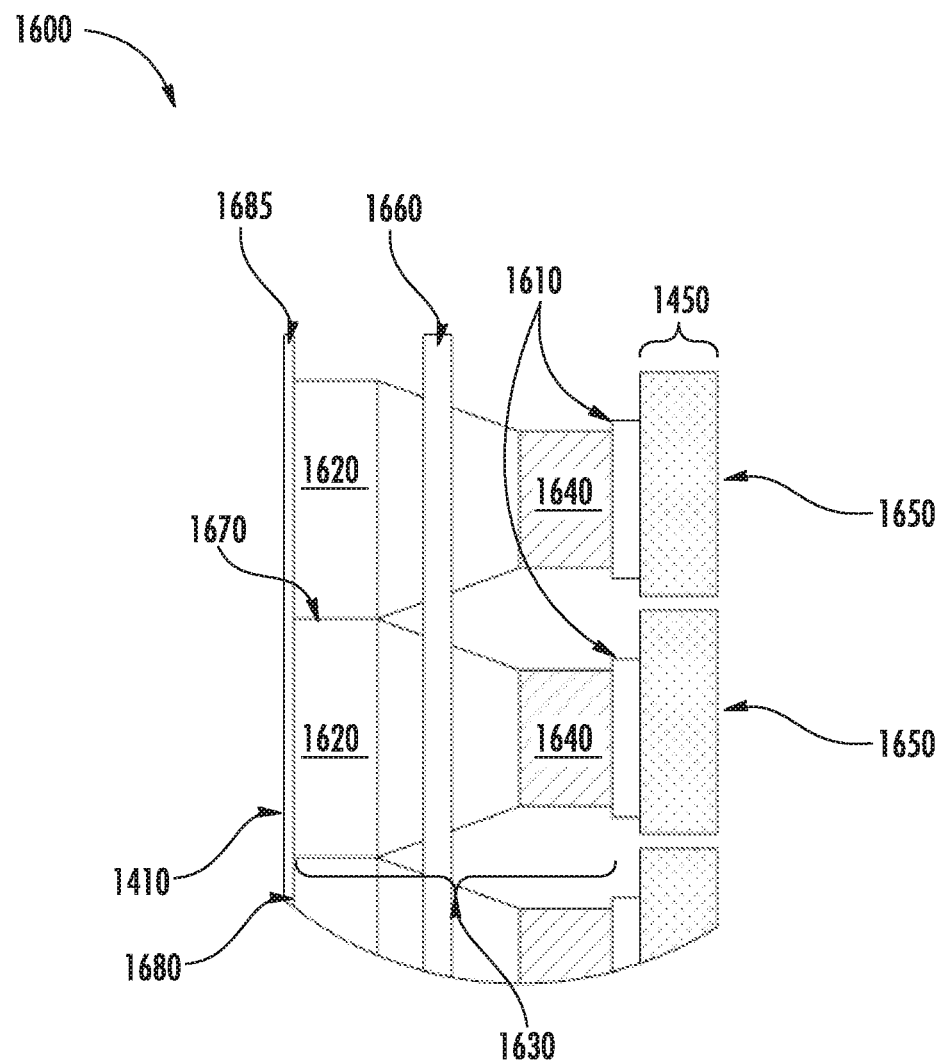
FIG. 16 contains a close-up view of the side view from FIG. 15 of the energy directing device.

FIG. 16 is the close-up view 1600 of the side view 1540 of the energy directing device 1400, consisting of a repeating structure comprised of energy relay element stacks 1630 arranged along a transverse orientation defined by first and second directions, used to propagate energy waves from the plurality of energy units 1450 to a single common seamless energy surface 1680 formed by the second surface of the energy relay element stacks. Each energy unit 1450 is composed of an energy source 1610 as well as the mechanical enclosure 1650 which houses the drive electronics. Each relay stack is composed of a faceplate 1640 with no magnification directly bonded to an energy source 1610 on one side, and a tapered energy relay 1620 on the other side, where the taper spatially magnifies the energy wave from the faceplate 1640 while propagating the energy to the seamless energy surface 1680. In one embodiment, the magnification of the tapered energy relay is 2:1. In one embodiment, tapered energy relays 1620 are held in place by a common base structure 1660, and each of these tapers are bonded to a faceplate 1640, which in turn is bonded to the energy unit 1450. Neighboring tapers 1620 are bonded or fused together at seam 1670 in order to ensure that the smallest possible seam gap is realized. All the tapered energy relays in the full 8×4 array are arranged in a seamless mosaic such that the second surface for each tapered energy relay forms a single contiguous energy surface 1680, which is polished during assembly to ensure flatness. In one embodiment, surface 1680 is polished to within 10 waves of flatness. Face plate 1685 has dimensions slightly larger than the dimensions of the surface 1680, and is placed in direct contact with surface 1680 in order to extend the field of view of the tapered energy surface 1680. The second surface of the faceplate forms the output energy surface 1410 for the energy directing device 1400.

In this embodiment of 1400, energy is propagated from each energy source 1610, through the relay stack 1630, and then substantially normal to the faceplate, defining the longitudinal direction, the first and second surfaces of each of the relay stacks extends generally along a transverse orientation defined by the first and second directions, where the longitudinal orientation is substantially normal to the transverse orientation. In one embodiment, energy waves propagating through at least one of the relay elements faceplate 1640, taper 1620, and faceplate 1685, have higher transport efficiency in the longitudinal orientation than in the transverse orientation and are localized in the transverse orientation due to randomized refractive index variability in the transverse orientation coupled with minimal refractive index variation in the longitudinal orientation. In some embodiments at least one of the relay elements faceplate 1640, taper 1620, and faceplate 1685 may be constructed of multicore fiber, with energy waves propagating within each relay element traveling in the longitudinal orientation determined by the alignment of fibers in this orientation.

In one embodiment, the energy waves passing through the first surface of 1640 have a first spatial resolution, while the energy waves passing through the second surface of tapered energy relay 1620 and through the face plate have a second resolution, and the second resolution is no less than about 50% of the first resolution. In another embodiment, the energy waves, while having a uniform profile at the first surface of the faceplate 1640, may pass through the seamless energy surfaces 1680 and 1410 radiating in every direction with an energy density in the forward direction that substantially fills a cone with an opening angle of +1-10 degrees relative to the normal to the seamless energy surface 1410, irrespective of location on this surface 1410.

In an embodiment, an energy directing device comprises one or more energy sources and one or more energy relay element stacks.

In an embodiment, each energy relay element of an energy directing device may comprise at least one of:
- a) one or more optical elements exhibiting transverse Anderson Localization;
- b) a plurality of optical fibers;
- c) loose coherent optical fibers;
- d) image combiners;
- e) one or more gradient index optical elements;
- f) one or more beam splitters;
- g) one or more prisms;
- h) one or more polarized optical elements;
- i) one or more multiple size or length optical elements for mechanical offset;
- j) one or more waveguides;
- k) one or more diffractive, refractive, reflective, holographic, lithographic, or transmissive elements; and
- l) one or more retroreflectors.

In an embodiment, a quantity of the one or more energy relay elements and a quantity of the one or more energy locations may define a mechanical dimension of the energy directing device. The quantity of optical relay elements incorporated into the system is unlimited and only constrained by mechanical considerations and the resultant seamless energy surface includes a plurality of lower resolution energy sources producing an infinite resolution energy surface only limited by the resolving power and image quality of the components included within the display device.

A mechanical structure may be preferable in order to hold the multiple relay components in a fashion that meets a certain tolerance specification. Mechanically, the energy relays that contain a second surface that forms the seamless energy surface are cut and polished to a high degree of accuracy before being bonded or fused together in order to align them and ensure that the smallest possible seam gap between the energy relays is possible. The seamless surface 1680 is polished after the relays 1620 are bonded together. In one such embodiment, using an epoxy that is thermally matched to the tapered energy relay material, it is possible to achieve a maximum seam gap of 50 um. In another embodiment, a manufacturing process that places the taper array under compression and/or heat provides the ability to fuse the elements together. In another embodiment, the use of plastic tapers can be more easily chemically fused or heat-treated to create the bond without additional bonding. For the avoidance of doubt, any methodology may be used to bond the array together, to explicitly include no bond other than gravity and/or force.

The energy surface may be polished individually and/or as a singular energy surface and may be any surface shape, including planar, spherical, cylindrical, conical, faceted, tiled, regular, non-regular, convex, concave, slanted, or any other geometric shape for a specified application. The optical elements may be mechanically mounted such that the optical axes are parallel, non-parallel and/or arranged with energy surface normal oriented in a specified way.

The ability to create various shapes outside of the active display area provides the ability to couple multiple optical elements in series to the same base structure through clamping structures, bonding processes, or any other mechanical means desired to hold one or more relay elements in place. The various shapes may be formed out of optical materials or bonded with additional appropriate materials. The mechanical structure leveraged to hold the resultant shape may be of the same form to fit over top of said structure. In one embodiment, an energy relay is designed with a square shape with a side that is equal to 10% of the total length of the energy relay, but 25% greater than the active area of the energy source in width and height. This energy relay is clamped with the matched mechanical structure and may leverage refractive index matching oil, refractive index matched epoxy, or the like. In the case of electromagnetic energy sources, the process to place any two optical elements in series may include mechanical or active alignment wherein visual feedback is provided to ensure that the appropriate tolerance of image alignment is performed. Typically, a display is mounted to the rear surface of the optical element prior to alignment, but this may or may not be desired depending on application.

In an embodiment, the second sides of terminal energy relay elements of each energy relay element stack may be arranged to form a singular seamless energy surface.

In an embodiment, the singular seamless energy surface formed by a mosaic of energy relay element stacks may be extended by placing a faceplate layer in direct contact with the surface, using a bonding agent, index matching oil, pressure, or gravity to adhere it to the energy surface. In one embodiment, the faceplate layer may be composed of a single piece of energy relay material, while in others it is composed of two or more pieces of energy relay material bonded or fused together. In one embodiment, the extension of a faceplate may increase the angle of emission of the energy waves relative to the normal to the seamless energy surface.

In an embodiment, the one or more energy relay element stacks may be configured to direct energy along propagation paths which extend between the one or more energy locations and the singular seamless energy surfaces.

In an embodiment, a separation between the edges of any two adjacent second surfaces of the terminal energy relay elements may be less than a minimum perceptible contour as defined by the visual acuity of a human eye having better than 20/40 vision at a distance, greater than the lesser of a height of the singular seamless energy surface or a width of the singular seamless energy surface, from the singular seamless energy surface.

In an embodiment, the energy relay elements of each energy relay element stack are arranged in an end-to-end configuration.

In an embodiment, energy may be directed through the one or more energy relay element stacks with zero magnification, non-zero magnification, or non-zero minification.

In an embodiment, any of the energy relay elements of the one or more energy relay element stacks may comprise an element exhibiting Transverse Anderson Localization, an optical fiber, a beam splitter, an image combiner, an element configured to alter an angular direction of energy passing therethrough, etc.

In an embodiment, energy directed along energy propagation paths may be electromagnetic energy defined by a wavelength, the wavelength belonging to a regime of the electromagnetic spectrum such as visible light, ultraviolet, infrared, x-ray, etc. In an embodiment, energy directed along energy propagation paths may be mechanical energy such as acoustic sound, tactile pressure, etc. A volumetric sound environment is a technology that effectively aspires to achieve holographic sound or similar technology. A dimensional tactile device produces an array of transducers, air emitters, or the like to generate a sensation of touching objects floating in midair that may be directly coupled to the visuals displayed in a light field display. Any other technologies that support interactive or immersive media may additionally be explored in conjunction with this holographic display. For the use of the energy directing device as a display surface, the electronics may be mounted directly to the pins of the individual displays, attached to the electronics with a socket such as a zero-insertion force (ZIF) connector, or by using an interposer and/or the like, to provide simplified installation and maintenance of the system. In one embodiment, display electronic components including display boards, FPGAs, ASICs, IO devices or similarly desired components preferable for the use of said display, may be mounted or tethered on flex or flexi-rigid cables in order to produce an offset between the display mounting plane and the location of the physical electronic package. Additional mechanical structures are provided to mount the electronics as desired for the device. This provides the ability to increase density of the optical elements, thereby reducing the optical magnification for any tapered optical relays and decreasing overall display size and/or weight.

Cooling structures may be designed to maintain system performance within a specified temperature range, wherein all mechanical structures may include additional copper or other similar material tubing to provide a liquid cooling system with a solid state liquid cooling system providing sufficient pressure on a thermostat regulator. Additional embodiments may include Peltier units or heat syncs and/or the like to maintain consistent system performance for the electronics, displays and/or any other components sensitive to temperature changes during operation or that may produce excess heat.

Figure 17:
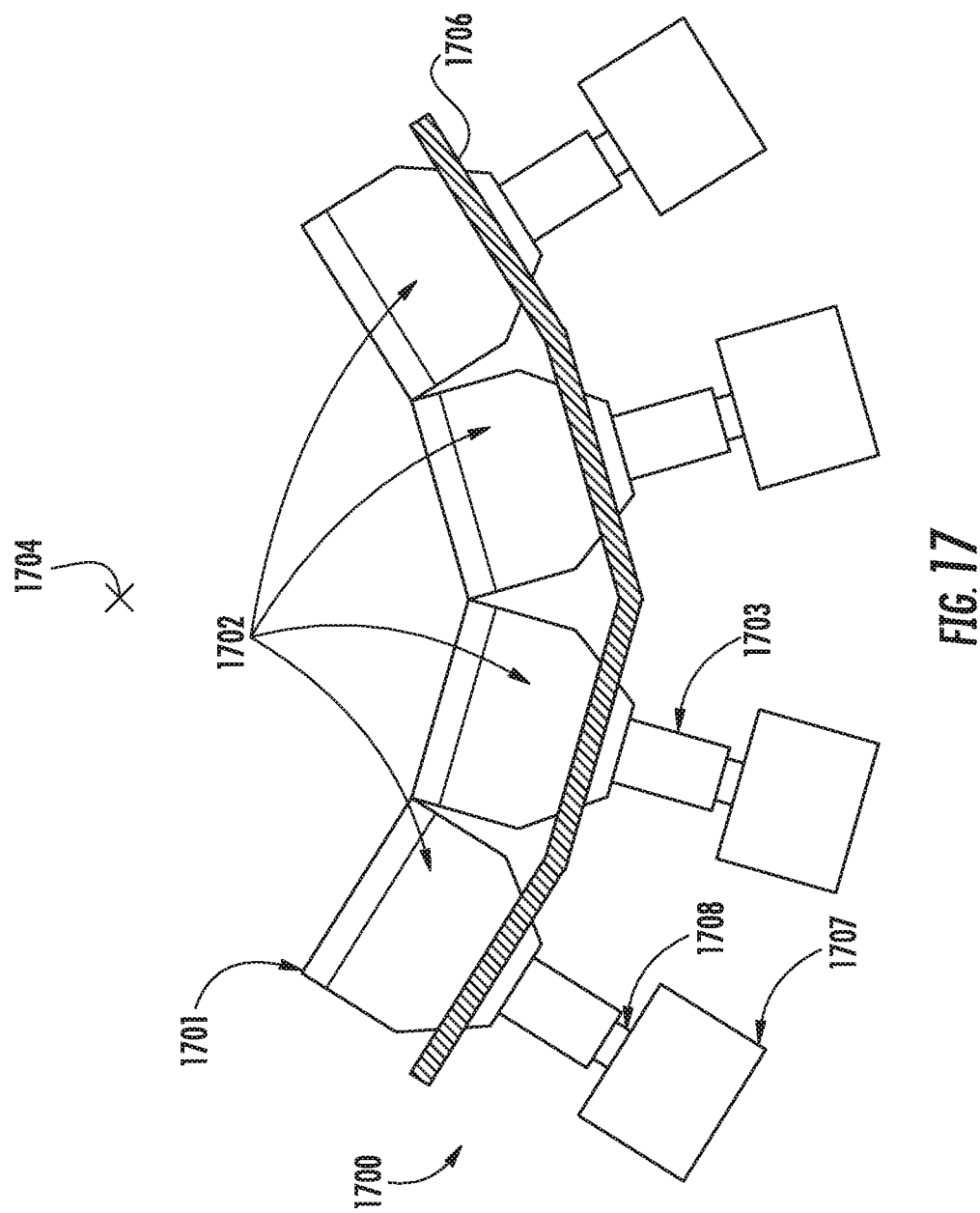
FIG. 17 illustrates a top view of an embodiment where energy relay element stacks are angled inward to a known point in space.

FIG. 17 illustrates a top view of an embodiment 1700 where energy relay element stacks composed of elements 1702 and 1703 are angled inward to a known point in space 1704, directing energy to propagate from multiple sources 1708 through the seamless energy surface 1701. The base structure 1706 directly supports the tapered energy relays 1702, where each taper is in turn bonded to relay 1703. For an embodiment where the energy directing device 1700 is a display, tapered optical relay elements 1702 are angled inward to point the taper optical axes towards a fixed point in space 1704. The energy sources 1708 comprise of individual displays, with display electronics contained with the display mechanical envelope 1707.

In an embodiment, the optical relay may comprise loose coherent optical relays. Flexible optical elements, image conduits, and the like may additionally be leveraged in order to further offset display and display electronics from the seamless energy surface. In this fashion, it is possible to form an optical relay bundle including multiple loose coherent optical relays or other similar optical technology to connect two separate structures, with a first structure containing the seamless energy surface, and the second structure containing the display and display electronics.

One or more additional optical elements may be mounted in front of, or behind the ends of each loose coherent optical relay. These additional elements may be mounted with epoxies, pressure, mechanical structures, or other methods known in the art.

Figure 18:
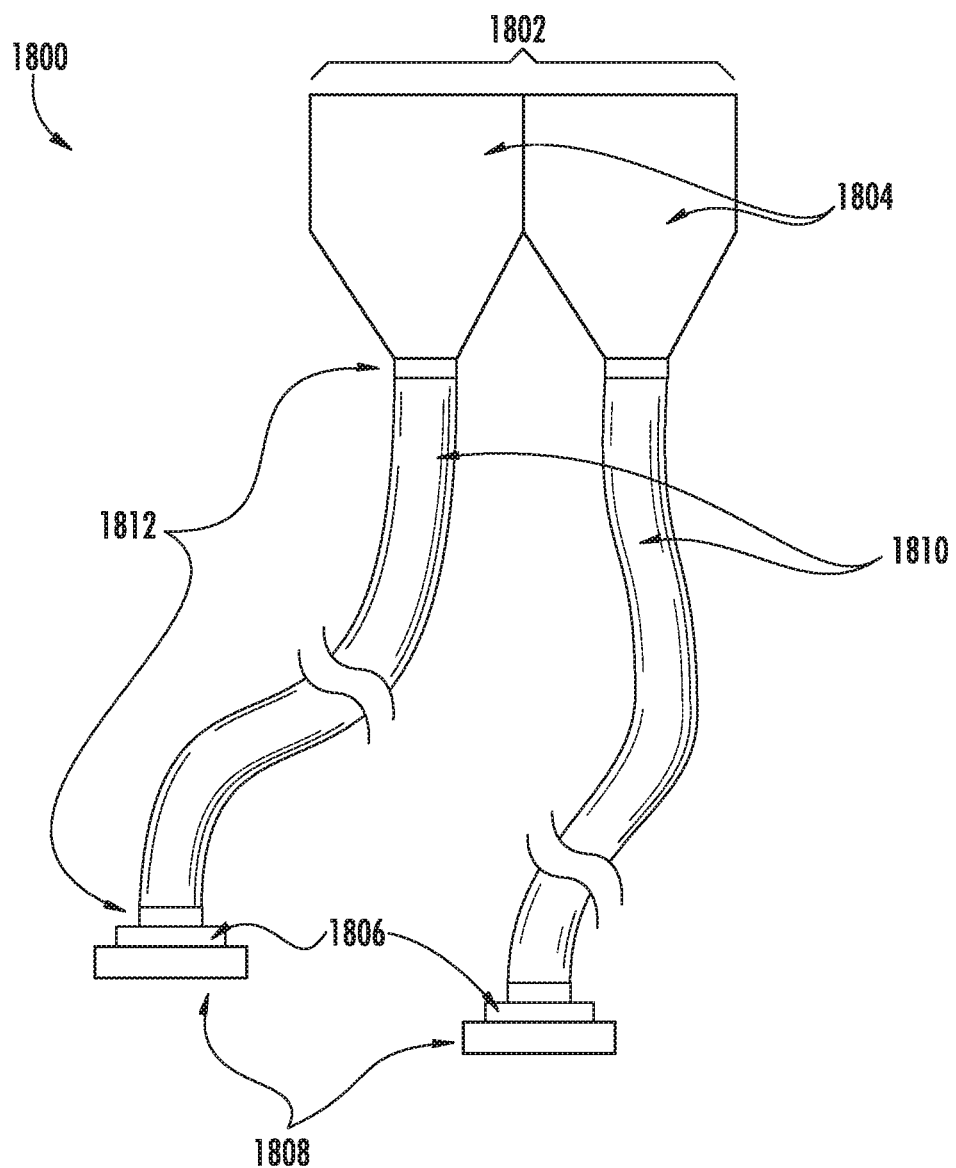
FIG. 18 is a top view illustration of an embodiment where the seamless energy surface is a display formed by tapered optical relays, while the display devices and the mechanical envelopes for the display electronics are located a distance away from the tapered relays.

FIG. 18 is a top view illustration of an embodiment 1800 where the seamless energy surface 1802 is a display formed by tapered optical relays 1804, while the display devices 1806 and the mechanical envelopes for the display electronics 1808 are located a distance away from the tapered relays 1804. Relaying light from display devices 1806 to the tapered optical relays 1804 are loose coherent optical relays 1810 each with end caps 1812 at either end. Embodiment 1800 allows the display devices 1806 to be disposed at the remote locations of 1808 away from the energy surface 1802 to ensure that a mechanical envelope of the display devices 1806 does not interfere with the positioning of energy surface 1802.

Optical elements may exhibit differing lengths to provide offset electronics as desired when formed in an alternating structure and provide the ability to increase density by the difference between the width of the electronic envelope minus the width of the optical element. In one such embodiment, a 5×5 optical relay mosaic contains two alternating optical relay lengths. In another embodiment, a 5×5 optical relay mosaic may contain 5 different optical relay lengths producing a pyramid-like structure, with the longest length at the center of the array, producing higher overall density for the resultant optical relay mosaic.

Figure 19:
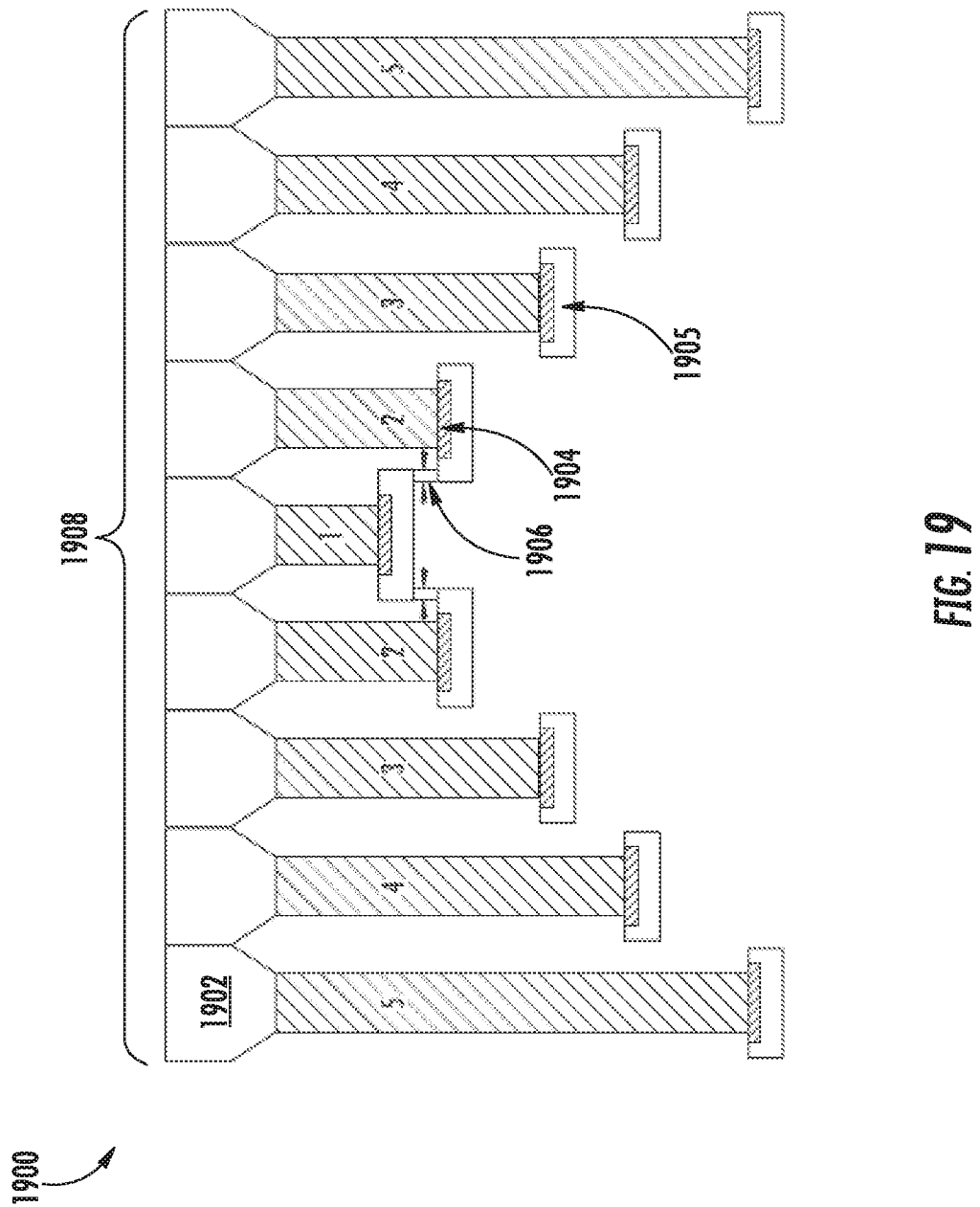
FIG. 19 is a side view illustration of an embodiment wherein a seamless display surface is composed of nine tapered optical relays.

FIG. 19 is a side view illustration of an embodiment 1900 wherein a seamless display surface 1908 is formed by nine tapered optical relays 1902, each associated with a display device 1904 through an optical face plate with one of five offset lengths 1, 2, 3, 4, or 5, such that no two adjacent display devices 1904 are connected to a face plate with the same offset length, providing sufficient clearance 1906 for respective mechanical envelopes 1905 for the display electronics.

Energy Combiner

In an embodiment, it is possible to use an energy combiner to leverage both projection based display as well as panel based display simultaneously, to leverage a self-illuminated display and a reflective display at the same time, or to leverage image projection and image sensing simultaneously.

Figure 20:
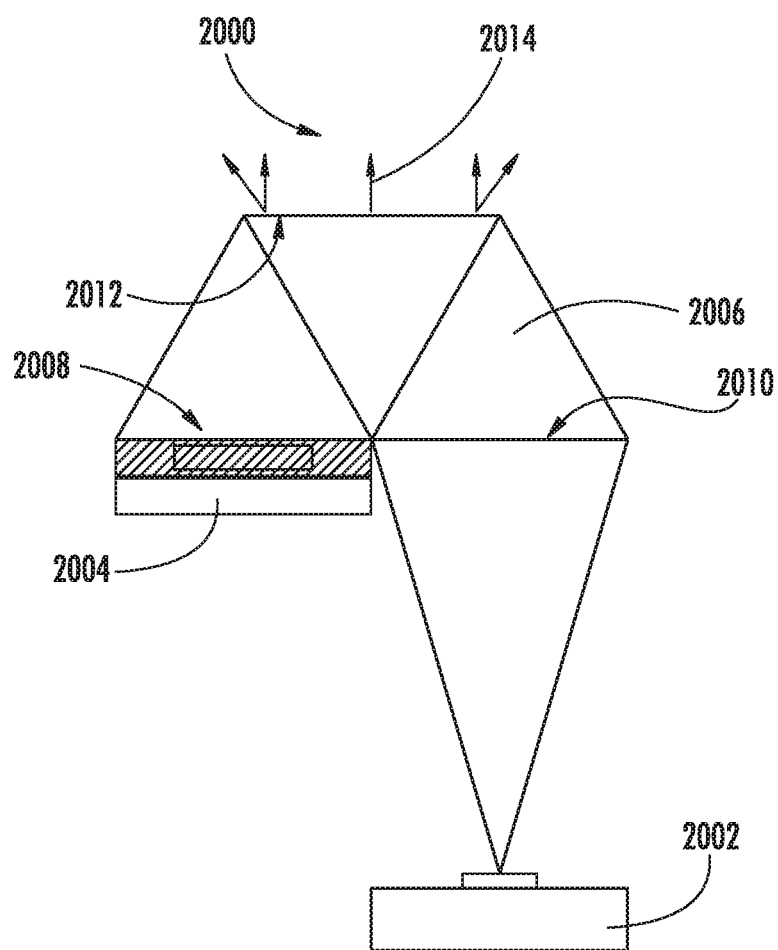
FIG. 20 is a top view illustration of an embodiment where a single projection source and a single display panel source are merged with an image combiner.

FIG. 20 is a top view illustration of an embodiment 2000 where a single projection source 2002 and a single display panel source 2004 are merged with an image combiner 2006. This may additionally be configured in any array or any such desired ratio of panel to projection technologies where the combination of only projection sources or panel based sources may also be implemented. Image combiner 2006 relays energy from first surfaces 2008, 2010 to combined display surface 2012, where the energy may propagate along propagation paths 2014.

A further embodiment where an energy combiner is leveraged and a first self-illuminated display is provided on one or more of the image combiner legs, and a second reflective display is provided on one or more of the image combiner legs, producing a virtual image that includes both the inherent data from the illuminated display in addition to any specific response and lighting changes as imposed upon by an external source of light simultaneously. The reflective surface may be considered a 'reflection pass' and contain differing imaging information as optimized for the displayed content.

In another embodiment, one leg of an image combiner may have a self-illuminated display, while the other leg may be connected to an imaging sensor. Through this approach, it is possible to optically scan in real time with a high degree of accuracy a finger print(s) or any other object that touches the surface of the display like papers, documents, etc. Through an inverse calibration process, it is possible to correct for all optical artifacts and generate extremely high-quality resolution. In another embodiment, this methodology for image capture with the image combiner provides the ability to generate an extremely accurate "white board" or artistic surface that can respond extremely accurately to location and interactively draw or perform any number of other display based functions.

In an embodiment, the singular seamless energy surface may be a virtual surface.

In an embodiment, an energy directing device may be an energy system, and the energy locations may comprise one or more energy devices, and the energy relay elements may comprise one or more energy components each made from elements that induce transverse Anderson Localization of energy transport therethrough, and each energy component further comprising a first energy surface and a second energy surface.

In an embodiment, the one or more components include: optical fiber, silicon, glass, polymer, optical relays, diffractive elements, holographic optical elements, refractive elements, reflective elements, optical face plates, optical combiners, beam splitters, prisms, polarization components, spatial light modulators, active pixels, liquid crystal cells, transparent displays, or any similar materials having Anderson localization or total internal reflection properties for forming the electromagnetic surface.

In an embodiment, the singular seamless energy surface may be any combination of the one or more components that are formed to accommodate any surface shape, including planar, spherical, cylindrical, conical, faceted, tiled, regular, non-regular, convex, concave, slanted, or any other geometric shape for a specified application.

In an embodiment, the energy surface is operable to guide localized light transmission to within four or less wavelengths of visible light.

In an embodiment, the energy device may include at least one of:
a) illumination sources emitting focused light, and wherein the focused light includes emissive, projection, or reflective display technologies, leveraging visible, IR, UV, coherent, laser, infrared, polarized or any other electromagnetic illumination source;
b) audible, ultrasonic, or other acoustic emitting devices provide immersive audio or volumetric tactile sensation from an acoustic field integrated directly into the energy system;
c) sensors for capturing or recording any energy in the electromagnetic spectrum, including structured, coherent, collimated, visible light, IR, UV, microwaves, radio waves, or other forms of electromagnetic radiation; or
d) acoustic receiving devices configured to provide sensory feedback or audible controls over an interactive system.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the desired characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. An energy system comprising:
a plurality of energy relay elements, each element comprising first and second component engineered structures, the first and second component engineered structures being arranged and configured such that each component engineered structure is operable to propagate energy therethrough in a longitudinal orientation between a first surface and a second surface of the respective energy relay element while propagation of energy in a transverse direction through the same respective energy relay element is limited by energy wave interference;
wherein each of the plurality of energy elements is configured to receive energy from one or more energy devices at energy locations on the first surface;
wherein distances that separate any two adjacent first surfaces of the respective energy relay elements from each other are less than distances that separate any two adjacent second surfaces of the respective energy relay elements from each other; and
wherein the second surfaces of the plurality of energy relay elements form a singular seamless energy surface.

2. The energy system of claim 1, wherein a first element of the plurality of energy relay elements comprises one of the following:
a) an optical fiber;
b) a beam splitter;
c) an image combiner;
d) a polymer material;
e) a glass material;
f) an arrangement of component engineered structures arranged to limit propagation energy in the transverse orientation due to wave interference;
g) an arrangement of component engineered structures arranged to induce g) Anderson Localization;
h) an arrangement of component engineered structures according to a tiling pattern;
i) an arrangement of component engineered structures according to a non-regular pattern;
j) an arrangement of component engineered structures according to a regular pattern;
k) an arrangement of component engineered structures according to a random pattern; or
l) an element configured to alter an angular direction of energy passing therethrough.

3. The energy system of claim 1, wherein the one or more energy devices comprise one of the following:
a) an illumination source emitting focused light;
b) an acoustic emitting device configured to provide immersive audio or volumetric tactile sensation from an acoustic field integrated into the energy system;
c) a sensor for capturing energy in the energy spectrum; or
d) an acoustic receiving device configured to provide sensory feedback to the energy system.

4. The energy system of claim 1, wherein energy received by the plurality of energy relay elements comprises electromagnetic energy having a wavelength, the wavelength belonging to a regime selected from a group consisting of:
a) visible light;
b) ultraviolet;
c) infrared; and
d) x-ray.

5. The energy system of claim 1, wherein energy received by the plurality of energy relay components comprises mechanical energy selected from a group consisting of:
a) acoustic sound; and
b) tactile pressure.

6. The energy system of claim 1, wherein the singular seamless energy surface comprises a planar profile, a curve profile, or a faceted profile.

7. An energy relay assembly comprising:
a plurality of energy relay elements, each comprising first and second component engineered structures, the first and second component engineered structures being arranged and configured such that each component engineered structure is operable to propagate energy therethrough in a longitudinal orientation between a first surface and a second surface of the respective energy relay element while propagation of energy in a transverse direction through the same respective energy relay element is limited by energy wave interference;
wherein each of the plurality of energy elements is configured to receive energy at energy locations on the first surface;
wherein distances that separate any two adjacent first surfaces of the respective energy relay elements from each other are less than distances that separate any two adjacent second surfaces of the respective energy relay elements from each other; and
wherein the plurality of energy relay elements are assembled such that the second surfaces of the plurality of energy relay elements form a singular seamless energy surface.

8. The energy system of claim 7, wherein a first element of the plurality of energy relay elements comprises one of the following:
a) an optical fiber;
b) a beam splitter;
c) an image combiner;
d) a polymer material;
e) a glass material;

f) an arrangement of component engineered structures arranged to limit propagation energy in the transverse orientation due to wave interference;
g) an arrangement of component engineered structures arranged to induce Anderson Localization;
h) an arrangement of component engineered structures according to a tiling pattern;
i) an arrangement of component engineered structures according to a non-regular pattern;
j) an arrangement of component engineered structures according to a regular pattern;
k) an arrangement of component engineered structures according to a random pattern; or
l) an element configured to alter an angular direction of energy passing therethrough.

9. The energy system of claim 7, wherein the energy received by the first surface of the plurality of energy relay elements is provided from one or more energy devices comprising one of the following:
a) an illumination source emitting focused light;
b) an acoustic emitting device configured to provide immersive audio or volumetric tactile sensation from an acoustic field integrated into the energy system;
c) a sensor for capturing energy in the energy spectrum; or
d) an acoustic receiving device configured to provide sensory feedback to the energy system.

10. The energy system of claim 7, wherein energy received by the plurality of energy relay elements comprises electromagnetic energy having a wavelength, the wavelength belonging to a regime selected from a group consisting of:
a) visible light;
b) ultraviolet;
c) infrared; and
d) x-ray.

11. The energy system of claim 7, wherein energy received by the plurality of energy relay components comprises mechanical energy selected from a group consisting of:
a) acoustic sound; and
b) tactile pressure.

12. The energy system of claim 7, wherein the singular seamless energy surface comprises a planar profile, a curve profile, or a faceted profile.

13. An energy relay element assembly, comprising:
a plurality of energy relay elements assembled such that respective energy surfaces of each of the plurality of energy relay elements are aligned to form a contiguous energy surface;
wherein each energy relay element comprises first component engineered structures and second component engineered structures, wherein the first and second component engineered structures are arranged in a substantially non-regular pattern in a transverse plane of the energy relay, wherein the first and second component engineered structures are configured to cooperate to transport energy, through both the first and second component engineered structure, along a longitudinal direction that is normal to a transverse direction, and the first and second component engineered structures are arranged to limit propagation energy in the transverse orientation due to wave interference.

14. The energy relay element assembly of claim 13, wherein, the first and second component engineered structures are arranged to induce Anderson Localization.

15. The energy relay element assembly of claim 13, wherein, the first and second component engineered structures are arranged to according to a tiling pattern.

16. The energy relay element assembly of claim 13, wherein a first element of the plurality of energy relay elements comprises one of the following:
a) an optical fiber;
b) a beam splitter;
c) an image combiner;
d) a polymer material;
e) a glass material;
f) an arrangement of component engineered structures arranged to limit propagation energy in the transverse orientation due to wave interference;
g) an arrangement of component engineered structures arranged to induce Anderson Localization;
h) an arrangement of component engineered structures according to a tiling pattern;
i) an arrangement of component engineered structures according to a non-regular pattern;
j) an arrangement of component engineered structures according to a regular pattern;
k) an arrangement of component engineered structures according to a random pattern; or
l) an element configured to alter an angular direction of energy passing therethrough.

17. The energy relay element assembly of claim 13, wherein the energy propagated through of the plurality of energy relay elements is provided from one or more energy devices comprising one of the following:
a) an illumination source emitting focused light;
b) an acoustic emitting device configured to provide immersive audio or volumetric tactile sensation from an acoustic field integrated into the energy system;
c) a sensor for capturing energy in the energy spectrum; or
d) an acoustic receiving device configured to provide sensory feedback to the energy system.

18. The energy relay element assembly of claim 13, wherein the energy propagated through of the plurality of energy relay elements comprises electromagnetic energy having a wavelength, the wavelength belonging to a regime selected from a group consisting of:
a) visible light;
b) ultraviolet;
c) infrared; and
d) x-ray.

19. The energy relay element assembly of claim 13, wherein energy received by the plurality of energy relay components comprises mechanical energy selected from a group consisting of:
a) acoustic sound; and
b) tactile pressure.

* * * * *